United States Patent
Hyde et al.

(10) Patent No.: US 10,034,805 B2
(45) Date of Patent: *Jul. 31, 2018

(54) SYSTEMS, DEVICES, AND METHODS INCLUDING A STAND-UP WHEEL CHAIR HAVING AUTOMATIC STABILITY CONTROL

(71) Applicant: ELWHA LLC, Bellevue, WA (US)

(72) Inventors: Roderick A. Hyde, Redmond, WA (US); Muriel Y. Ishikawa, Livermore, CA (US); Stephen L. Malaska, Snoqualmie, WA (US); Clarence T. Tegreene, Mercer Island, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/283,811

(22) Filed: Oct. 3, 2016

(65) Prior Publication Data

US 2017/0020754 A1    Jan. 26, 2017

Related U.S. Application Data

(63) Continuation of application No. 14/815,362, filed on Jul. 31, 2015, now Pat. No. 9,493,049, which is a continuation of application No. 14/035,877, filed on Sep. 24, 2013, now Pat. No. 9,144,526, which is a continuation of application No. 14/035,602, filed on Sep. 24, 2013, now Pat. No. 9,060,911.

(51) Int. Cl.
| | |
|---|---|
| *A61G 5/14* | (2006.01) |
| *A61G 5/10* | (2006.01) |
| *B60G 21/00* | (2006.01) |
| *B60G 21/08* | (2006.01) |
| *A61G 5/04* | (2013.01) |

(52) U.S. Cl.
CPC .............. *A61G 5/1089* (2016.11); *A61G 5/04* (2013.01); *A61G 5/14* (2013.01); *B60G 21/002* (2013.01); *B60G 21/005* (2013.01); *B60G 21/08* (2013.01); *A61G 2200/34* (2013.01); *A61G 2200/36* (2013.01); *A61G 2203/10* (2013.01); *A61G 2203/30* (2013.01)

(58) Field of Classification Search
CPC .... B60G 21/08; B60G 21/002; B60G 21/005; A61G 5/14; A61G 2005/1089; A61G 2203/30

See application file for complete search history.

(56) References Cited

U.S. PATENT DOCUMENTS

| | | |
|---|---|---|
| 4,413,693 A | 11/1983 | Derby |
| 5,701,965 A | 12/1997 | Kamen et al. |
| 5,772,226 A | 6/1998 | Bobichon |

(Continued)

FOREIGN PATENT DOCUMENTS

| | | |
|---|---|---|
| JP | 2001304908 A | 10/2001 |
| JP | 2003021535 A | 1/2003 |
| JP | 2007181639 A | 7/2007 |

OTHER PUBLICATIONS

PCT International Search Report dated Jan. 14, 2015 for International Application No. PCT/US2014/057119, pp. 1-3.

*Primary Examiner* — Drew J Brown

(74) *Attorney, Agent, or Firm* — Advent, LLP; Daniel J. Honz

(57) ABSTRACT

Systems, devices, and methods are described for providing, among other things, a stand-up wheel chair having automatic stability control.

20 Claims, 7 Drawing Sheets

(56) References Cited

U.S. PATENT DOCUMENTS

| | | |
|---|---|---|
| 6,571,892 B2 | 6/2003 | Kamen et al. |
| 6,773,032 B2 | 8/2004 | Redman et al. |
| 7,434,882 B1 | 10/2008 | Hodges |
| 8,128,120 B2 | 3/2012 | Porcheron |
| 8,700,250 B1 | 4/2014 | Curtis et al. |
| 2001/0018637 A1 | 8/2001 | Hamilton |
| 2002/0023787 A1 | 2/2002 | Kamen et al. |
| 2002/0170754 A1 | 11/2002 | Heinzmann |
| 2003/0227161 A1 | 12/2003 | Redman et al. |
| 2004/0007425 A1 | 1/2004 | Kamen et al. |
| 2007/0063480 A1 | 3/2007 | Porcheron |
| 2007/0296177 A1 | 12/2007 | Porcheron |
| 2008/0066979 A1 | 3/2008 | Carter |
| 2008/0100031 A1 | 5/2008 | Murnen et al. |
| 2011/0074563 A1 | 3/2011 | Chang et al. |
| 2011/0215540 A1 | 9/2011 | Hunziker et al. |
| 2011/0231085 A1 | 9/2011 | Kim et al. |
| 2011/0238291 A1 | 9/2011 | Bach |
| 2012/0217072 A1 | 8/2012 | Hoffmann et al. |
| 2012/0313335 A1 | 12/2012 | Zanderlehn et al. |
| 2013/0233100 A1 | 9/2013 | Kim |
| 2013/0274995 A1 | 10/2013 | Kim et al. |

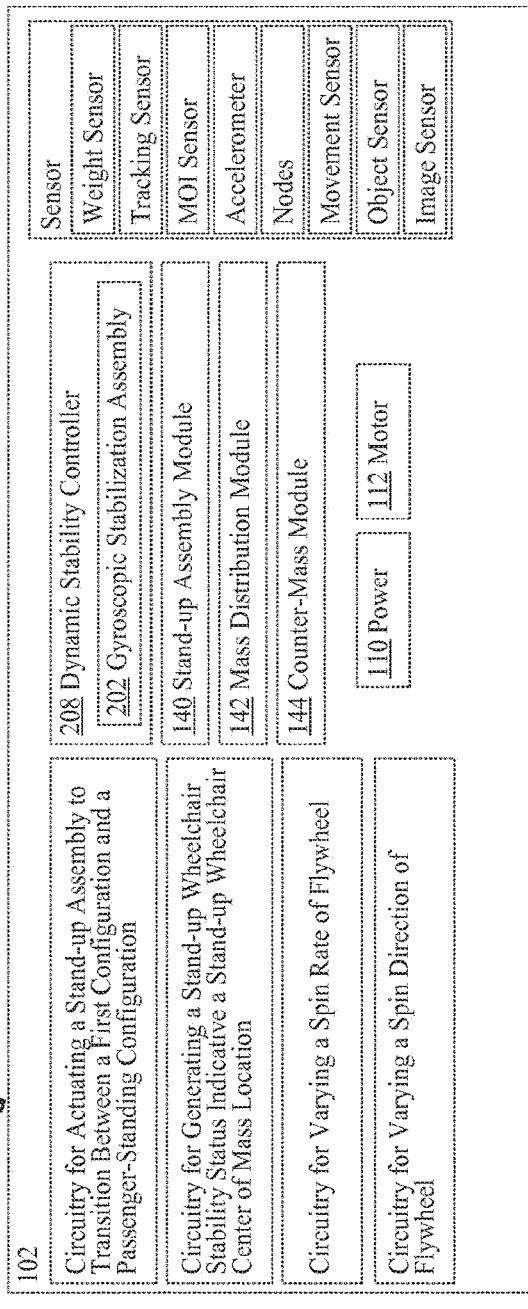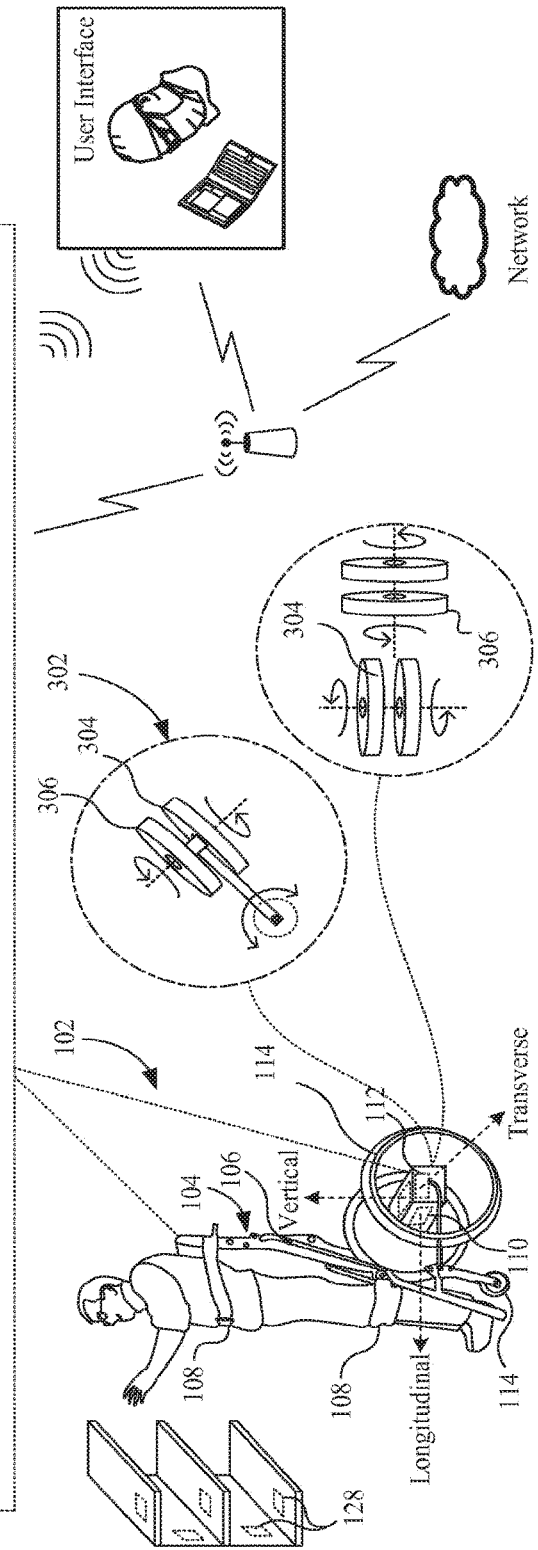
FIG. 3

SYSTEMS, DEVICES, AND METHODS INCLUDING A STAND-UP WHEEL CHAIR HAVING AUTOMATIC STABILITY CONTROL

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related Applications," if any, listed below.

Priority Applications

The present application constitutes a continuation-in-part of U.S. patent application Ser. No. 14/815,362, entitled SYSTEMS, DEVICES, AND METHODS INCLUDING A STAND-UP WHEEL CHAIR HAVING AUTOMATIC STABILITY CONTROL, naming RODERICK A. HYDE, MURIEL Y. ISHIKAWA, STEPHEN L. MALASKA, CLARENCE T. TEGREENE as inventors, filed Jul. 31, 2015 , which in turn constitutes a continuation-in-part of U.S. patent application Ser. No. 14/035,877, entitled SYSTEMS, DEVICES, AND METHODS INCLUDING A STAND-UP WHEEL CHAIR HAVING AUTOMATIC STABILITY CONTROL, naming RODERICK A. HYDE, MURIEL Y. ISHIKAWA, STEPHEN L. MALASKA, CLARENCE T. TEGREENE as inventors, filed Sep. 24, 2013 , which in turn constitutes a continuation-in-part of U.S. patent application Ser. No. 14/035,602, entitled SYSTEMS, DEVICES, AND METHODS INCLUDING A STAND-UP WHEEL CHAIR HAVING AUTOMATIC STABILITY CONTROL, naming RODERICK A. HYDE, MURIEL Y. ISHIKAWA, STEPHEN L. MALASKA, CLARENCE T. TEGREENE as inventors, filed Sep. 24, 2013.

Related Applications

None

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

SUMMARY

In an aspect, the present disclosure is directed to, among other things, a stand-up wheelchair. In an embodiment, the stand-up wheelchair includes a stand-up assembly structured and dimensioned to support a passenger transitioning between a sitting position, a kneeling position, a reaching position, or a leaning position, and a substantially standing position. In an embodiment, the stand-up wheelchair includes a plurality of rotatable members operable to frictionally interface the stand-up wheelchair to a travel surface and to move the stand-up wheelchair along the travel surface. In an embodiment, the stand-up wheelchair includes a variable center of mass assembly including one or more counter masses selectively displaceable along a substantially vertical axis of the stand-up wheelchair. In an embodiment, the stand-up wheelchair includes a dynamic stability control module operably coupled to the variable center of mass assembly. In an embodiment, the dynamic stability control module including circuitry operable to activate a displacement of the one or more counter masses responsive to a change in a stability status of the stand-up wheelchair.

In an aspect, the present disclosure is directed to, among other things, a stand-up wheelchair system. In an embodiment, the stand-up wheelchair system includes circuitry for actuating a stand-up assembly to transition between a first configuration and a passenger-standing configuration. In an embodiment, the stand-up wheelchair system includes circuitry for generating a stand-up wheelchair stability status indicative of a stand-up wheelchair center of mass location. In an embodiment, the stand-up wheelchair system includes circuitry for controlling a displacement of one or more counter masses responsive to a change in the stand-up wheelchair stability status associated with a transition between the first position and the substantially standing position.

In an aspect, the present disclosure is directed to, among other things, a method of operating a stand-up wheelchair. In an embodiment, the method includes actuating a stand-up assembly configured to transition from a first configuration to a standing configuration. In an embodiment, the method includes actuating a displacement of one or more counter masses responsive to changes in a stand-up wheelchair vertical center of mass location associated with a transition from the first configuration to the standing configuration. In an embodiment, the method includes generating a stand-up wheelchair stability status indicative of a stand-up wheelchair center of mass location based on one or more sensor inputs. In an embodiment, the method includes actuating a displacement of one or more counter masses responsive to changes in the stand-up wheelchair stability status.

In an aspect, the present disclosure is directed to, among other things, a stand-up wheelchair system. In an embodiment, the stand-up wheelchair system includes a stand-up assembly module including circuitry for operating a stand-up assembly configured to support a passenger transitioning from a sitting configuration to a standing configuration. In an embodiment, the stand-up wheelchair system includes a mass distribution module including circuitry for sensing a stand-up wheelchair mass distribution and for determining a stand-up wheelchair center of mass location. In an embodiment, the stand-up wheelchair system includes a countermass module including circuitry for actuating a displacement of one or more counter masses selectively displaceable along at least a substantially vertical axis responsive to changes in a stand-up wheelchair vertical center of mass location.

In an aspect, the present disclosure is directed to, among other things, a stand-up wheelchair including a stand-up assembly having an articulated structure movable from a sitting configuration, a kneeling configuration, a reaching configuration, or a leaning configuration, to a substantially standing configuration. In an embodiment, the stand-up assembly is structured and dimensioned to support a passenger from a sitting position, a kneeling position, a reaching position, or a leaning position, to a substantially standing position. In an embodiment, the stand-up wheelchair includes a plurality of rotatable members operable to frictionally interface the stand-up wheelchair to a travel surface and to move the stand-up wheelchair along the travel surface. In an embodiment, the stand-up wheelchair includes a gyroscopic stabilization assembly having at least one gyroscope operable to apply a righting torque along one or more of a transverse axis, a longitudinal axis, and a vertical axis of the stand-up wheelchair. In an embodiment, the stand-up wheelchair includes a dynamic stability controller operably coupled to the gyroscopic stabilization assembly. In an embodiment, the dynamic stability controller is operable to cause the gyroscopic stabilization assembly to precess about an output axis responsive to a change in an externally applied torque.

In an aspect, the present disclosure is directed to, among other things, a stand-up wheelchair system including circuitry for actuating a stand-up assembly configured to support a passenger transitioning from a sitting configuration to a standing configuration. In an embodiment, the stand-up wheelchair system includes circuitry for sensing a stand-up wheelchair mass distribution and for determining a stand-up wheelchair center of mass location. In an embodiment, the stand-up wheelchair system includes circuitry for actuating a gyroscopic stabilization assembly having at least one gyroscope operable to apply a righting torque along one or more of a transverse axis, a longitudinal axis, and a vertical axis of the stand-up wheelchair responsive to changes in a stand-up wheelchair center of mass location (e.g., changes in a stand-up wheelchair vertical center of mass location, changes in a stand-up wheelchair horizontal center of mass location, or the like). In an embodiment, the stand-up wheelchair system includes circuitry for actuating a gyroscopic stabilization assembly responsive to changes in stand-up wheelchair stability. In an embodiment, the stand-up wheelchair system includes circuitry for actuating a gyroscopic stabilization assembly responsive to changes in a stand-up wheelchair yaw, pitch, or roll. In an embodiment, the stand-up wheelchair system includes circuitry for actuating a gyroscopic stabilization assembly responsive to changes in a stand-up wheelchair tilt.

In an aspect, the present disclosure is directed to, among other things, a stand-up wheelchair system including a stand-up assembly module having circuitry for actuating a stand-up assembly to transition from a sitting configuration to a standing configuration. In an embodiment, the stand-up wheelchair system includes a mass distribution module including circuitry for sensing a stand-up wheelchair mass distribution and for determining a stand-up wheelchair vertical center of mass location. In an embodiment, the stand-up wheelchair system includes a gyroscopic stabilizer module including circuitry for actuating a gyroscopic stabilizer assembly responsive to a change in a stand-up wheelchair mass distribution or a stand-up wheelchair vertical center of mass location.

In an aspect, the present disclosure is directed to, among other things, a method of operating stand-up wheelchair. In an embodiment, the method includes actuating a stand-up assembly configured to support a passenger transitioning from a first configuration to a standing configuration. In an embodiment, the method includes determining a stand-up wheelchair center of mass location. In an embodiment, the method includes applying a righting torque responsive to changes in a stand-up wheelchair center of mass location.

In an aspect, the present disclosure is directed to, among other things, a stand-up wheelchair including a stand-up assembly having an articulated structure movable between a sitting configuration, a kneeling configuration, a reaching configuration, a leaning configuration, or a standing configuration and a different one of a sitting configuration, a kneeling configuration, a reaching configuration, a leaning configuration, or a standing configuration. In an embodiment, the stand-up wheelchair includes a plurality of rotatable members operable to frictionally interface the stand-up wheelchair to a travel surface and to move the stand-up wheelchair along the travel surface. In an embodiment, the stand-up wheelchair includes a stabilization assembly having a plurality of flywheels operable to apply a righting torque along one or more of a transverse axis, a longitudinal axis, a vertical axis of the stand-up wheelchair, or combinations thereof. In an embodiment, the stand-up wheelchair includes a dynamic stability controller operably coupled to the stabilization assembly, the dynamic stability controller operable to cause one or more of the plurality of a flywheels to spin responsive to a change in an externally applied torque.

In an aspect, the present disclosure is directed to, among other things, a stand-up wheelchair system including circuitry for actuating a stand-up assembly configured to support a passenger transitioning between a sitting position, a kneeling position, a reaching position, or a leaning position, and a substantially standing position. In an embodiment, the stand-up wheelchair system includes circuitry for sensing a stand-up wheelchair mass distribution and for determining a stand-up wheelchair center of mass location. In an embodiment, the stand-up wheelchair system includes circuitry for actuating rotation of at least a first flywheel about a first axis responsive to changes in a stand-up wheelchair center of mass location.

In an aspect, the present disclosure is directed to, among other things, a method of operating stand-up wheelchair including actuating a stand-up assembly configured to support a passenger transitioning from a first configuration to a standing configuration. In an embodiment, the method includes actuating an angular-momentum-based stabilizer responsive to an applied torque associated with a stand-up assembly transitioning from a first configuration to a standing configuration.

In an aspect, the present disclosure is directed to, among other things, a method of operating stand-up wheelchair including actuating a stand-up assembly configured to support a passenger transitioning between a first configuration and a second configuration, the first configuration one of a sitting configuration, a kneeling configuration, a reaching configuration, a leaning configuration, or a standing configuration, the second configuration a different one of a sitting configuration, a kneeling configuration, a reaching configuration, a leaning configuration, or a standing configuration. In an embodiment, the method includes determining a stand-up wheelchair center of mass location. In an embodiment, the method includes applying a righting torque responsive to changes in a stand-up wheelchair center of mass location.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 3 is a perspective view of stand-up wheelchair system according to one embodiment.

DETAILED DESCRIPTION

Figure 1:
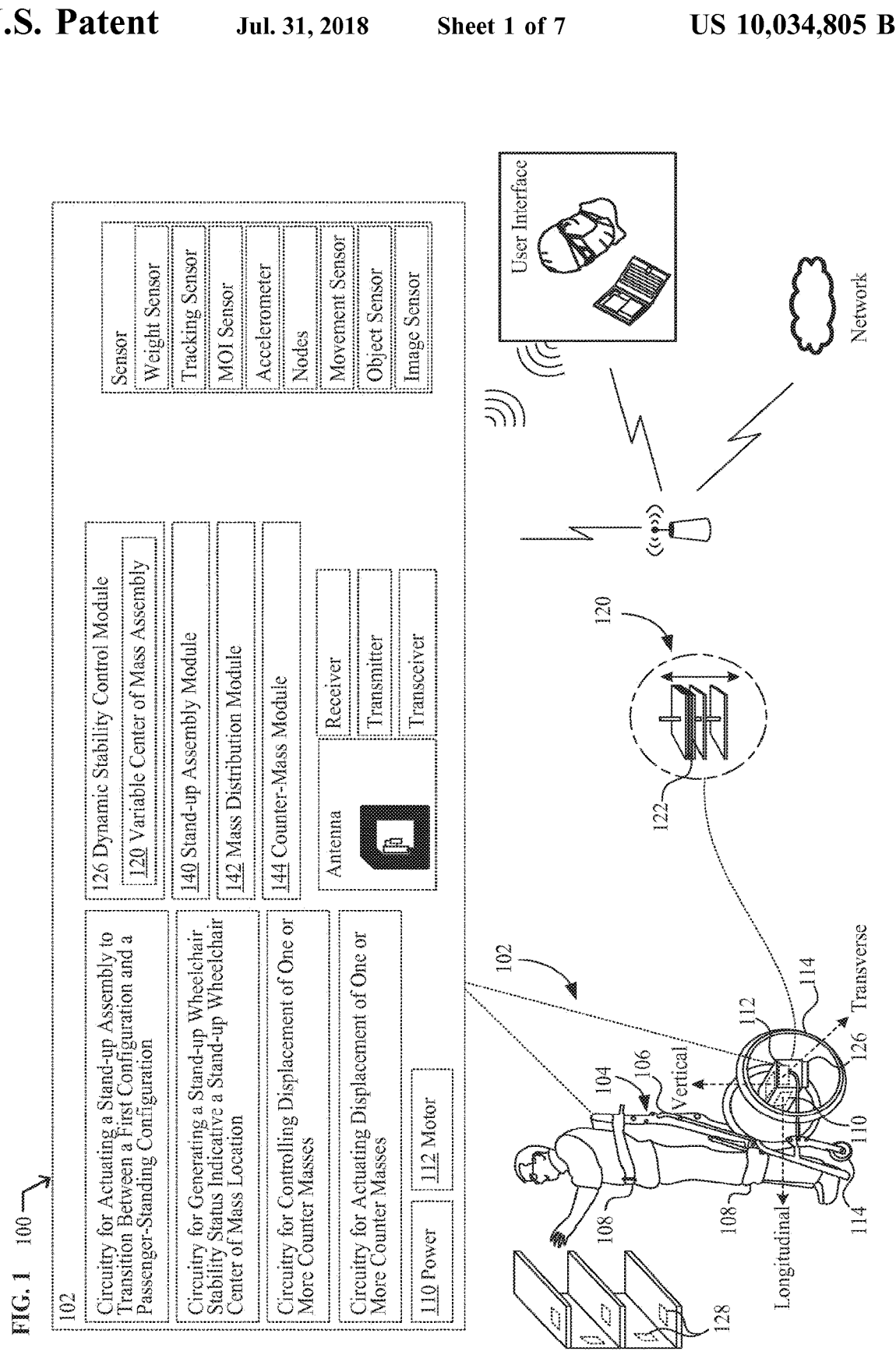
FIG. 1 is a perspective view of stand-up wheelchair system according to one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Assistive devices such as stand-up wheelchairs may enhance mobility, accessibility, or independence for users, and may also improve quality of life. Assistive devices such as stand-up wheelchairs may also provide postural and sitting support to a user transitioning between a sitting position, a kneeling position, a reaching position, or a leaning position, and a substantially standing position. For example, stand-up wheel chairs may provide users with the ability to rise into a standing position when needed and then return to a seated position. Such mobility may improve blood circulation, kidney function, bladder functioning, as well as reduce bone decalcification, reduce osteoporosis risk, or assist in preventing pressure sores. Assistive devices such as stand-up wheelchairs may enable user to become mobile, remain healthy, participate fully in community life, as well as reduce dependence on others.

FIG. 1 shows a stand-up wheelchair system 100 in which one or more methodologies or technologies can be implemented such as, for example, transporting and physically supporting an individual subject (e.g., a patient, a human subject, an animal subject, a user, a passenger, etc.), as well as assisting and supporting a user to transition between a sitting position, a kneeling position, a reaching position, or a leaning position, and a substantially standing position. In an embodiment, the stand-up wheelchair system 100 includes a stand-up wheelchair 102.

In an embodiment, the system 100 includes a stand-up wheelchair 102 having a stand-up assembly 104 structured and dimensioned to support a passenger transitioning between a sitting position, a kneeling position, a reaching position, or a leaning position, and a substantially standing position. For example, in an embodiment, the stand-up wheelchair 102 includes an articulated structure 106 movable between a first configuration and at least a second configuration. In an embodiment, the first configuration is operable to support a passenger in at least one of a sitting position, a kneeling position, a reaching position, a leaning position, or a standing position, and the second configuration is operable to support a passenger in a different one of a sitting position, a kneeling position, a reaching position, a leaning position, or a standing position. In an embodiment, the articulated structure 106 forms part of a selectively tiltable and retractable passenger support structure. In an embodiment, the articulated structure 106 includes one or more support mechanisms 108 for securing a passenger transitioning, for example, between a sitting position, a kneeling position, a reaching position, or a leaning position, and a substantially standing position.

In an embodiment, the stand-up wheelchair 102 includes a power source 110 and a motor 112 operably coupled to the stand-up assembly 104, and configured to power the stand-up assembly 104 to transition between a first configuration and at least a second configuration. In an embodiment, the first configuration is operable to support a passenger in at least one of a sitting position, a kneeling position, a reaching position, a leaning position, or a standing position, and the second configuration is operable to support a passenger in a different one of a sitting position, a kneeling position, a reaching position, a leaning position, or a standing position. In an embodiment, the stand-up assembly 104 includes an articulated structure movable between a first configuration and at least a second configuration in the presence of an applied potential. In an embodiment, the stand-up assembly 104 includes an articulated structure movable between a first configuration operable to support a passenger in at least one of a sitting position, a kneeling position, a reaching position, a leaning position, or a standing position, and the second configuration operable to support a passenger in a different one of a sitting position, a kneeling position, a reaching position, a leaning position, or a standing position, in the presence of an applied potential.

In an embodiment, the stand-up wheelchair 102 includes a plurality of rotatable members 114 operable to frictionally interface the stand-up wheelchair 102 to a travel surface and to move the stand-up wheelchair 102 along a travel surface. In an embodiment, the plurality of rotatable members 114 includes at least one wheel. In an embodiment, the plurality of rotatable members 114 includes at least one wheel having an electric wheel hub motor. In an embodiment, the plurality of rotatable members 114 includes a disc brake system. In an embodiment, the plurality of rotatable members 114 includes a regenerative brake system. In an embodiment, the pluralities of rotatable members 114 include one or more brushless electric motors.

In an embodiment, one or more of the plurality of rotatable members 114 are operably coupled to one or more actuators that use an electrical current or magnetic actuating force to vary the motion of a rotating component (e.g., an actuator that rotates an axle coupled to the wheel to give it steering, an actuator that activates a rotating component forming part of an electric brake system, a magnetic bearing, a magnetic torque device, a brushless electric motor, etc. to vary velocity, etc.).

In an embodiment, one or more of the plurality of rotatable members 114 are operably coupled to a steering assembly operable to vary a steering angle of at least one of the plurality of rotatable members 114. In an embodiment, the steering assembly includes one or more sensors (e.g., yaw-rate sensors, angular velocity sensors, steering angle sensors, wheel speed sensors, position sensors, nodes, etc.). For example, in an embodiment, the steering assembly includes a steering sensor operable to detect a steering angle, orientation, etc., associated with a steered one of the plurality of rotatable members 114. In an embodiment, the steering assembly includes a velocity sensor operable to detect a velocity of the stand-up wheelchair 102. In an embodiment, the steering assembly is operably coupled to an acceleration sensor operable to detect the acceleration of the stand-up wheelchair 102. In an embodiment, the steering assembly is operably coupled to vehicle position sensor operable to detect a geographical location of the stand-up wheelchair 102. In an embodiment, the steering assembly is operably coupled to a rotational rate sensor operable to detect a rate of rotation of one or more of the plurality of rotatable members 114.

In an embodiment, the stand-up wheelchair 102 includes a power source 110 and a motor 112 operably coupled one or more of the plurality of rotatable members 114, and is configured to drive one or more of the plurality of rotatable members 114. In an embodiment, the stand-up wheelchair 102 includes a powertrain operably coupled to a power source 110. In an embodiment, the powertrain is configured to supply power to one or more power train components to generate power and deliver it to a travel path surface. Non-limiting examples of powertrain components include motors, engines, transmissions, drive shafts, differentials, drive rotatable members, final drive assemblies, or the like. In an embodiment, the stand-up wheelchair 102 includes one or more powertrains. In an embodiment, the stand-up wheelchair 102 includes a powertrain operably coupled to a plurality of rotatable members 114 and configured to cause a change in position, acceleration, direction, momentum, or the like, of the stand-up wheelchair 102. In an embodiment, the stand-up wheelchair 102 includes one or more rotatable members 114 operable to receive torque from the powertrain. In an embodiment, each rotatable member 114 is operably coupled to a respective powertrain and a steering assembly.

In an embodiment, during operation, one or more of the plurality of rotatable members 114 provide a driving force for the stand-up wheelchair 102. In an embodiment, the stand-up wheelchair 102 takes the form of a multi-wheel drive stand-up wheelchair 102. For example, in an embodiment, the stand-up wheelchair 102 takes the form of a two-wheel drive wheelchair, a four-wheel drive wheelchair, an all-drive wheelchair, or the like. In an embodiment, during operation, one or more drive wheels provide a driving force for the stand-up wheelchair 102. In an embodiment, the stand-up wheelchair 102 is configured for omni-directional travel. In an embodiment, the stand-up wheelchair 102 can be driven while a passenger is sitting, kneeling, reaching, leaning, or standing. In an embodiment, the stand-up wheelchair 102 can be driven while a passenger is standing.

In an embodiment, each rotatable member 114 can be controlled separately. For example, in an embodiment, a steering angle, an orientation, a velocity, etc., can be controlled separately for each rotatable member 114. In an embodiment, the system 100 includes circuitry for controlling one or more rotatable members 114. For example, in an embodiment, a rotatable member 114 is operably coupled to at least a first electromagnetic motor that drives a rotatable member 114 and a second electromagnetic motor that can steer the rotatable member 114. In an embodiment, each of the first, second, third electromagnetic motor, etc., can be separately controlled for precise movement. In an embodiment, each electromagnetic motor is powered by a battery. In an embodiment, a plurality of electromagnetic motors is powered by a single battery.

In an embodiment, the stand-up wheelchair 102 includes a variable center of mass assembly 120 including one or more counter masses 122. In an embodiment, the one or more counter masses 122 are selectively displaceable along a substantially vertical axis of the stand-up wheelchair 102.

In an embodiment, the stand-up wheelchair 102 includes one or more modules. For example, in an embodiment, the stand-up wheelchair 102 includes a dynamic stability control module 126 operably coupled to the variable center of mass assembly 120 and configured to selectively displace one or more counter masses 122.

In an embodiment, a module includes, among other things, one or more computing devices such as a processor (e.g., a microprocessor), a central processing unit (CPU), a digital signal processor (DSP), an application-specific integrated circuit (ASIC), a field programmable gate array (FPGA), or the like, or any combinations thereof, and can include discrete digital or analog circuit elements or electronics, or combinations thereof. In an embodiment, a module includes one or more ASICs having a plurality of predefined logic components. In an embodiment, a module includes one or more FPGAs, each having a plurality of programmable logic components.

In an embodiment, the dynamic stability control module 126 includes a module having one or more components operably coupled (e.g., communicatively, electromagnetically, magnetically, ultrasonically, optically, inductively, electrically, capacitively coupled, or the like) to each other. In an embodiment, a module includes one or more remotely located components. In an embodiment, remotely located components are operably coupled, for example, via wireless communication. In an embodiment, remotely located components are operably coupled, for example, via one or more receivers, transmitters, transceivers, antennas, or the like. In an embodiment, the drive control module includes a module having one or more routines, components, data structures, interfaces, and the like.

In an embodiment, a module includes memory that, for example, stores instructions or information. For example, in an embodiment, at least one control module includes memory that stores operator-guide verification information, operator-guide identification information, operator-guide registration information, patient identification information, navigation plan information, travel path markings information, travel-route status information, vehicle status information, travel-route status information, etc. Non-limiting examples of memory include volatile memory (e.g., Random Access Memory (RAM), Dynamic Random Access Memory (DRAM), or the like), non-volatile memory (e.g., Read-Only Memory (ROM), Electrically Erasable Programmable Read-Only Memory (EEPROM), Compact Disc Read-Only Memory (CD-ROM), or the like), persistent memory, or the like. Further non-limiting examples of memory include Erasable Programmable Read-Only Memory (EPROM), flash memory, or the like. In an embodiment, the memory is coupled to, for example, one or more computing devices by one or more instructions, information, or power buses. For example, in an embodiment, the dynamic stability control module 126 includes memory that, for example, stores dynamic stability control information, center of mass information, travel-route status information, displacement mass location, or the like.

In an embodiment, a module includes one or more computer-readable media drives, interface sockets, Universal Serial Bus (USB) ports, memory card slots, or the like, and one or more input/output components such as, for example, a graphical user interface, a display, a keyboard, a keypad, a trackball, a joystick, a touch-screen, a mouse, a switch, a dial, or the like, and any other peripheral device. In an embodiment, a module includes one or more user input/output components, user interfaces, or the like, that are operably coupled to at least one computing device configured to control (electrical, electromechanical, software-implemented, firmware-implemented, or other control, or combinations thereof) at least one parameter associated with, for example, controlling one or more of activating, driving, navigating, operating, braking, steering, articulating, or the like, a stand-up wheelchair 102.

In an embodiment, a module includes a computer-readable media drive or memory slot that is configured to accept signal-bearing medium (e.g., computer-readable memory media, computer-readable recording media, or the like). In an embodiment, a program for causing a system to execute any of the disclosed methods can be stored on, for example, a computer-readable recording medium (CRMM), a signal-bearing medium, or the like. Non-limiting examples of signal-bearing media include a recordable type medium such as a magnetic tape, floppy disk, a hard disk drive, a Compact Disc (CD), a Digital Video Disk (DVD), Blu-Ray Disc, a digital tape, a computer memory, or the like, as well as transmission type medium such as a digital or an analog communication medium (e.g., a fiber optic cable, a waveguide, a wired communications link, a wireless communication link (e.g., receiver, transmitter, transceiver, transmission logic, reception logic, etc.). Further non-limiting examples of signal-bearing media include, but are not limited to, DVD-ROM, DVD-RAM, DVD+RW, DVD-RW, DVD-R, DVD+R, CD-ROM, Super Audio CD, CD-R, CD+R, CD+RW, CD-RW, Video Compact Discs, Super Video Discs, flash memory, magnetic tape, magneto-optic disk, MINIDISC, non-volatile memory card, EEPROM, optical disk, optical storage, RAM, ROM, system memory, web server, or the like.

In an embodiment, the dynamic stability control module 126 is operable to activate a displacement of the one or more counter masses 122 responsive to a change in a stability status of the stand-up wheelchair 102. For example, in an embodiment, the dynamic stability control module 126 includes circuitry for activating displacement of the one or more counter masses 122 responsive to changes in a stand-up wheelchair 102 yaw, pitch, or roll. In an embodiment, the dynamic stability control module 126 is operable to activate a displacement of the one or more counter masses 122 responsive to a stability status indicative of a detected change in a center of mass location. In an embodiment, the dynamic stability control module 126 is operable to activate a displacement of the one or more counter masses 122 responsive to a change in configuration of the stand-up assembly 104.

In an embodiment, the dynamic stability control module 126 includes a plurality of counter masses 122 and circuitry for activating displacement of at least one of the plurality of counter masses 122 responsive to a configuration change of the stand-up assembly 104. For example, in an embodiment, the dynamic stability control module 126 includes circuitry for activating a lock mechanism operable to unsecure one or more counter masses 122 responsive to detecting that the stand-up assembly 104 is transitioning between a first configuration and a second configuration. In an embodiment, the dynamic stability control module 126 includes circuitry for activating a latch mechanism operable to unlatch the one or more counter masses 122 responsive to a change in configuration of the stand-up assembly 104.

In an embodiment, the stand-up wheelchair 102 includes a power source 110 operably coupled to the dynamic stability control module 126. In an embodiment, the dynamic stability control module 126 includes circuitry operable to activate a displacement of the one or more counter masses 122 responsive to a change in a stability status. For example, in an embodiment, the dynamic stability control module 126 includes circuitry for activating displacement of the one or more counter masses 122 responsive to a stability status indicative of a detected change in a center of mass location. For example, in an embodiment, the dynamic stability control module 126 includes circuitry for activating displacement of the one or more counter masses 122 responsive to a stability status indicative of a detected change in a vertical center of mass location. In an embodiment, the dynamic stability control module 126 includes circuitry for activating displacement of the one or more counter masses 122 responsive to a change in configuration of the stand-up assembly 104.

In an embodiment, the dynamic stability control module 126 includes a plurality of counter masses 122 and circuitry for activating displacement of at least one of the plurality of counter masses in responsive to a change in configuration of the stand-up assembly 104. For example, in an embodiment, the dynamic stability control module 126 includes circuitry for activating a lock mechanisms operable to unsecure one or more counter masses 122 responsive to a change in configuration of the stand-up assembly 104. In an embodiment, the dynamic stability control module 126 includes circuitry for activating a latch mechanisms operable to unlatch the one or more counter masses 122 responsive to a change in configuration of the stand-up assembly 104.

In an embodiment, the dynamic stability control module 126 includes circuitry for activating displacement of one or more trim masses. For example, during operation, the stand-up assembly 104 is configured to engage or disengage one or more trim masses to balance a stand-up wheelchair 102 user's mass. In an embodiment, the stand-up assembly 104 is configured to add or subtract one or more trim masses to balance a stand-up wheelchair 102 user's mass. In an embodiment, the dynamic stability control module 126 includes circuitry for un-securing one or more trim masses. In an embodiment, the dynamic stability control module 126 includes circuitry for unlatching one or more trim masses. In an embodiment, the dynamic stability control module 126 includes circuitry for actuating a displacement mechanism associated with one or more trim masses. In an embodiment, the dynamic stability control module 126 includes circuitry for actuating a locking mechanism associated with one or more trim masses. In an embodiment, the dynamic stability control module 126 includes circuitry for actuating a latching mechanism associated with one or more trim masses.

In an embodiment, the one or more counter masses 122 operate in a counterweight arrangement, moving in opposition, responsive to detected changes in stability of the stand-up wheelchair 104. In an embodiment, the stand-up assembly 104 is configured to lock or unlock, via an electro-mechanical component, the one or more counter masses 122 responsive to detected changes in stability of the stand-up wheelchair 104. In an embodiment, the stand-up assembly 104 is configured to latch or unlatch via an electro-mechanical component the one or more counter masses 122 responsive to detected changes in stability of the stand-up wheelchair 104.

In an embodiment, the dynamic stability control module 126 includes circuitry for activating displacement of the one or more counter masses 122 responsive to a change in posture of a passenger of the stand-up wheel chair 102. In an embodiment, the dynamic stability control module 126 includes circuitry for activating displacement of the one or more counter masses 122 responsive to a change in a stability status associated with the stand-up assembly 104 transitioning between a sitting configuration, a kneeling configuration, a reaching configuration, or a leaning configuration, and a substantially standing configuration.

In an embodiment, the dynamic stability control module 126 includes circuitry for activating displacement of the one or more counter masses 122 responsive to detection of a target speed of the stand-up wheelchair 102. In an embodiment, the dynamic stability control module 126 includes circuitry for activating displacement of the one or more counter masses 122 responsive to detection of a target stand-up wheelchair acceleration. In an embodiment, the dynamic stability control module 126 includes circuitry for activating displacement of the one or more counter masses 122 responsive to detection of a stand-up wheelchair target tilt. In an embodiment, the dynamic stability control module 126 includes circuitry for activating displacement of the one or more counter masses 122 responsive to detection of a target stand-up wheelchair turning rate.

In an embodiment, the dynamic stability control module 126 includes circuitry for activating displacement of the one or more counter masses 122, along a substantially vertical axis of the stand-up wheelchair 102, responsive to a detected change in a center of mass location. In an embodiment, the dynamic stability control module 126 includes circuitry for activating displacement of the one or more counter masses 122, along a substantially lateral axis of the stand-up wheelchair 102, responsive to a detected change in a center of mass location. In an embodiment, the dynamic stability control module 126 includes circuitry for activating displacement of the one or more counter masses 122, along a substantially lateral axis of the stand-up wheelchair 102, responsive to a threshold target center of mass location.

In an embodiment, the dynamic stability control module 126 includes circuitry for activating displacement of a stand-up wheelchair payload component (e.g., a battery, a motor, a seat, a seatback, etc.), along a substantially vertical axis of the stand-up wheelchair, responsive to a change in a stability status. In an embodiment, the dynamic stability control module 126 includes circuitry for activating displacement of the one or more counter masses 122 along the substantially vertical axis of the stand-up wheelchair responsive to detection of a target speed. In an embodiment, the dynamic stability control module 126 includes circuitry for activating displacement of the one or more counter masses 122 along the substantially vertical axis of the stand-up wheelchair responsive to detection of a stability status indicative of a stand-up wheelchair leaning, tipping, or tilting condition.

In an embodiment, the dynamic stability control module 126 includes circuitry for activating displacement of the one or more counter masses 122 along the substantially vertical axis of the stand-up wheelchair responsive to a configuration change of the stand-up assembly 104. In an embodiment, the dynamic stability control module 126 includes circuitry for activating selective displacement of the one or more counter masses 122 along the substantially vertical axis of the stand-up wheelchair. In an embodiment, the dynamic stability control module 126 includes circuitry for generating a real-time stand-up wheelchair stability status indicative of a stand-up wheelchair center of mass location. For example, in an embodiment, the dynamic stability control module 126 includes one or more sensors for detecting a mass distribution of the stand-up wheelchair 102.

In an embodiment, the dynamic stability control module 126 includes circuitry for generating a real-time stand-up wheelchair stability status indicative of a stand-up wheelchair mass distribution. In an embodiment, the dynamic stability control module 126 includes circuitry for actuating the stand-up assembly 104 to transition between a less stable configuration and a more stable configuration responsive to a detected change in a stability measure. In an embodiment, the dynamic stability control module 126 includes circuitry for causing the stand-up assembly 104 to retract responsive to a detected change in a stability measure.

In an embodiment, the system 100 includes a stand-up wheelchair 102 having circuitry for activating the dynamic stability control module 126 responsive to activation of stand-up wheelchair brake system. In an embodiment, the system 100 includes a stand-up wheelchair 102 having circuitry for activating the dynamic stability control module 126 responsive to a change in a stand-up wheelchair brake system status. In an embodiment, the system 100 includes a stand-up wheelchair 102 having circuitry for activating the dynamic stability control module 126 responsive to activation of stand-up wheelchair propulsion system. In an embodiment, the system 100 includes a stand-up wheelchair 102 having circuitry for activating the dynamic stability control module 126 responsive to activation of stand-up wheelchair steering mechanism.

In an embodiment, a stand-up wheelchair system 100 includes circuitry for actuating a stand-up assembly 104 to transition between a first configuration and a passenger-standing configuration. In an embodiment, the circuitry for actuating the stand-up assembly 104 includes circuitry for actuating the stand-up assembly 104 to assist a passenger from a sitting position, a kneeling position, a reaching position, or a leaning position to a substantially standing position. For example, in an embodiment, the circuitry for actuating the stand-up assembly 104 includes circuitry for actuating the stand-up assembly 104 to assist a passenger from a kneeling position to a substantially standing position.

In an embodiment, a stand-up wheelchair system 100 includes circuitry for controlling a displacement of one or more counter masses 122 responsive to a change in the stand-up wheelchair stability status associated with a transition between the first position and the substantially standing position. In an embodiment, the circuitry for controlling the displacement of the one or more counter masses 122 includes one or more modules that automatically activate when the circuitry for actuating the stand-up assembly 104 is activated. In an embodiment, the circuitry for controlling the displacement of the one or more counter masses 122 is operable to activate displacement of the one or more counter masses 122 responsive to a detected stand-up wheelchair stability status indicative of a change in configuration of a stand-up assembly 104 as it assists a passenger from a first position to a substantially standing position. In an embodiment, the circuitry for controlling the displacement of the one or more counter masses 122 includes circuitry for activating displacement of the one or more counter masses 122 responsive to a detected change in stand-up wheelchair stability status indicative of an upward movement of a vertical center of mass of the stand-up wheelchair. In an embodiment, a stand-up wheelchair system 100 includes circuitry for actuating a displacement of one or more counter masses 122 when the stand-up assembly 104 is transitioning from a sitting configuration to a standing configuration.

In an embodiment, a stand-up wheelchair system 100 includes circuitry for generating a stand-up wheelchair stability status indicative of a stand-up wheelchair center of mass location. In an embodiment, the circuitry for generating a stand-up wheelchair stability status includes one or more sensors, sensor nodes, motes, or the like. Non-limiting examples of sensors include weight sensor, moment of inertia sensor, sensors for determining a travel distance, travel-path sensors for detecting a remote object along a travel path, accelerometers, or the like. Further non-limiting examples of sensors include acoustic sensors, optical sensors, electromagnetic energy sensors, image sensors, photodiode arrays, charge-coupled devices (CCDs), complementary metal-oxide-semiconductor (CMOS) devices, transducers, optical recognition sensors, infrared sensors, radio frequency components sensors, thermo sensor, or the like. In an embodiment, the circuitry for generating a stand-up wheelchair stability status includes one or more sensors and is configured to detect a stand-up wheelchair center of mass. In an embodiment, the circuitry for generating a stand-up wheelchair stability status includes one or more sensors and is configured to detect a location of stand-up wheelchair 102.

In an embodiment, the circuitry for generating the stand-up wheelchair stability status includes at least one weight sensor or moment of inertia sensor. In an embodiment, the circuitry for controlling the displacement of the one or more counter masses 122 is operable to activate displacement of the one or more counter masses 122 responsive to measurements obtained from the weight sensor or moment of inertia sensor. In an embodiment, the circuitry for generating the stand-up wheelchair stability status includes one or more sensors for detecting a stand-up wheelchair mass distribution. In an embodiment, the circuitry for generating the stand-up wheelchair stability status includes one or more load sensors. In an embodiment, the circuitry for generating the stand-up wheelchair stability status includes circuitry for generating an estimate of the stand-up wheelchair center of gravity responsive to one or more sensor inputs indicative of stand-up wheelchair mass distribution.

In an embodiment, a stand-up wheelchair system 100 includes a stand-up assembly module 140 including circuitry for operating a stand-up assembly configured to support a passenger transitioning between a sitting configuration and a standing configuration. In an embodiment, a stand-up wheelchair system 100 includes a mass distribution module 142 including circuitry for sensing a stand-up wheelchair mass distribution and for determining a stand-up wheelchair center of mass location. In an embodiment, a stand-up wheelchair system 100 includes a counter-mass module 144 including circuitry for actuating a displacement of one or more counter masses 122 selectively displaceable along at least a substantially vertical axis responsive to changes in a stand-up wheelchair vertical center of mass location.

In an embodiment, at least one of the a stand-up assembly module 140, the mass distribution module 142, the counter-mass module 144, or any other module, and the other devices disclosed herein operates in a networked environment using connections to one or more remote computing devices (e.g., a common network node, a network computer, a network node, a peer device, a personal computer, a router, a server, a tablet PC, a tablet, etc.) and typically includes many or all of the elements described above. In an embodiment, the connections include connections to a local area network (LAN), a wide area network (WAN), or other networks. In an embodiment, the connections include connections to one or more enterprise-wide computer networks, intranets, and the Internet. In an embodiment, a stand-up wheelchair system 100, a stand-up wheelchair 102, a dynamic stability control module 126, or the like operate in a cloud-computing environment including one or more cloud computing systems (e.g., private cloud computing systems, public cloud computing systems, hybrid cloud computing systems, or the like).

Figure 2:
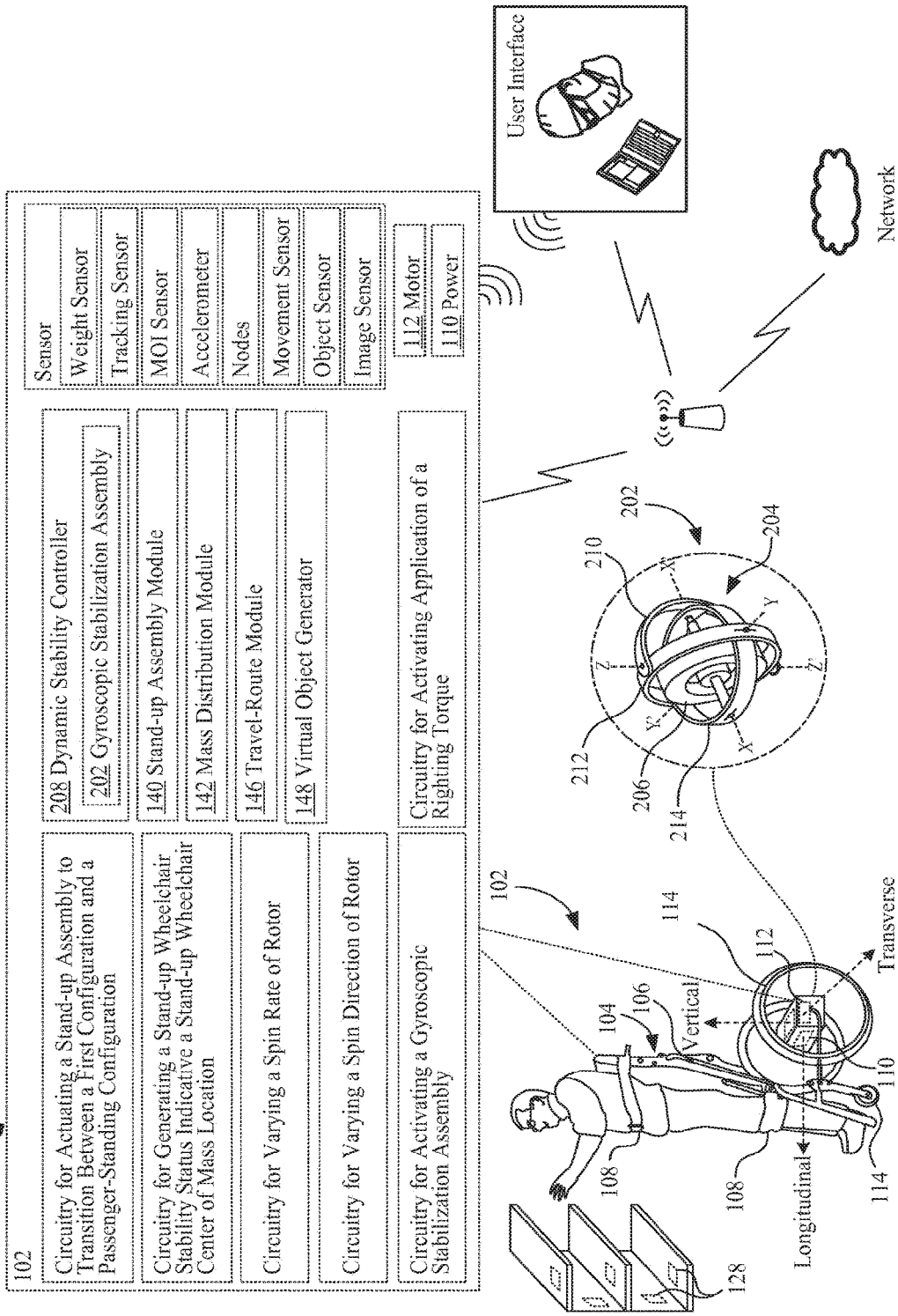
FIG. 2 is a perspective view of stand-up wheelchair system according to one embodiment.

FIG. 2 shows a stand-up wheelchair system 100 in which one or more methodologies or technologies can be implemented such as, for example, transporting and physically supporting an individual subject (e.g., a patient, a human subject, an animal subject, a user, a passenger, etc.), as well as assisting and supporting a user to transition between a sitting position, a kneeling position, a reaching position, or a leaning position, and a substantially standing position. In an embodiment, the stand-up wheelchair system 100 includes a stand-up wheelchair 102 having a stand-up assembly 104. In an embodiment, the stand-up assembly 104 includes an articulated structure movable from a sitting configuration, a kneeling configuration, a reaching configuration, or a leaning configuration, to a substantially standing configuration. In an embodiment, the stand-up assembly 104 is structured and dimensioned to support a passenger from a sitting position, a kneeling position, a reaching position, or a leaning position, to a substantially standing position. In an embodiment, the stand-up wheelchair system 100 includes a stand-up wheelchair 102 having a plurality of rotatable members 114 operable to frictionally interface the stand-up wheelchair to a travel surface and to move the stand-up wheelchair along the travel surface.

In an embodiment, the stand-up wheelchair 102 includes a gyroscopic stabilization assembly 202. In an embodiment, the gyroscopic stabilization assembly 202 includes at least one gyroscope 204 operable to apply a righting torque. For example, in an embodiment, the gyroscopic stabilization assembly 202 includes at least one gyroscope 204 operable to apply a righting torque along one or more of a transverse axis, a longitudinal axis, and a vertical axis of the stand-up wheelchair 102.

In an embodiment, the gyroscopic stabilization assembly 202 includes at least one gyroscope 204 having gimbal structure including at least one rotor 206 and at least one ring. In an embodiment, the gyroscopic stabilization assembly 202 includes at least one high-speed spinning rotor 206 that is supported by a gimbal structure including a plurality of ring structures. In an embodiment, a rotor 206 is supported by the gimbal structure and is configure to pivot about an x, y, and z-axis.

In an embodiment, the rotor 206 is configured to spin at high speeds resulting in a gyroscopic torque that exerts a righting torque to counteract an externally applied torque on the stand-up wheelchair 102. For example, during operation, when gimbal torque is applied to the gimbal structure, the rotor 206 generates an output torque in a direction substantially perpendicular to the gimbal torque. In an embodiment, the output torque is obtained from the cross product of the gyroscopic stabilization assembly's 202 angular momentum and the gimbal structure's angular velocity. In an embodiment, during operation, the output torque is the direction counter to the externally applied torque, resulting in a net reduction in a change of angular motion of the stand-up wheelchair 102. In an embodiment, during operation, if the stand-up wheelchair 102 is tipped, tilted, destabilized, etc., the gimbal structure is configured to apply a righting torque to counteract an externally applied torque on the stand-up wheelchair 102.

In an embodiment, the stand-up wheelchair 102 includes circuitry for varying a spin rate of the rotor 206. In an embodiment, the stand-up wheelchair 102 includes circuitry for varying a spin rate of the rotor 206 responsive to changes in a stand-up wheelchair stability status. In an embodiment, the stand-up wheelchair 102 includes circuitry for varying a spin rate of the rotor 206 responsive to an externally applied torque. For example, during operation, the circuitry for varying the spin rate is operable to increase or decrease a spin rate of the rotor 206 to vary a righting torque responsive to an externally applied torque. In an embodiment, the stand-up wheelchair 102 includes circuitry for varying a spin rate of the rotor 206 responsive to changes in a stand-up wheelchair center of mass location.

In an embodiment, the stand-up wheelchair 102 includes circuitry for varying a spin direction of the rotor 206 responsive to an externally applied torque. In an embodiment, the stand-up wheelchair 102 includes circuitry for varying a spin direction of the rotor 206 responsive to changes in a stand-up wheelchair stability status. In an embodiment, the stand-up wheelchair 102 includes circuitry for varying a spin direction of the rotor 206 responsive to changes in a stand-up wheelchair center of mass location. In an embodiment, the gyroscopic stabilization assembly 202 includes a rotor 206 operable to rotate about the spin axis responsive to an externally applied torque.

In an embodiment, the gyroscopic stabilization assembly 202 includes a plurality of gimbal structures. In an embodiment, the gyroscopic stabilization assembly 202 includes at least one gyroscope 204 having a frame structure 210, an outer ring structure 212, and an inter ring structure 214. In an embodiment, the gyroscopic stabilization assembly 202 includes at least one gyroscope 204 having a spin axis (shown as segment XX' in FIG. 2), an input axis (shown as line YY' in FIG. 2), and an output axis (shown as line ZZ' in FIG. 2).

In an embodiment, the gyroscopic stabilization assembly 202 is configured to have a spin axis alignable along a substantially vertical axis of the stand-up wheelchair 102, an input axis alignable along a substantially transverse axis of the stand-up wheelchair 102, and an output axis alignable along a substantially longitudinal axis of the stand-up wheelchair 102. In an embodiment, the gyroscopic stabilization assembly 202 is configured to have a spin axis alignable along a substantially longitudinal axis of the stand-up wheelchair 102, an input axis alignable along a substantially vertical axis of the stand-up wheelchair 102, and an output axis alignable along a substantially transverse axis of the stand-up wheelchair 102. In an embodiment, the gyroscopic stabilization assembly 202 is configured to have a spin axis alignable along a substantially transverse axis of the stand-up wheelchair 102, an input axis alignable along a substantially longitudinal axis of the stand-up wheelchair 102, and an output axis alignable along a substantially vertical axis of the stand-up wheelchair 102. In an embodiment, the gyroscopic stabilization assembly 202 is configured to have a spin axis alignable along a substantially vertical axis of the stand-up wheelchair 102, an input axis alignable along a substantially longitudinal axis of the stand-up wheelchair 102, and an output axis alignable along a substantially transverse axis of the stand-up wheelchair 102. In an embodiment, the gyroscopic stabilization assembly 202 is configured to have a spin axis alignable along a substantially longitudinal axis of the stand-up wheelchair 102, an input axis alignable along a substantially transverse axis of the stand-up wheelchair 102, and an output axis alignable along a substantially vertical axis of the stand-up wheelchair 102. In an embodiment, the gyroscopic stabilization assembly 202 is configured to have a spin axis alignable along a substantially transverse axis of the stand-up wheelchair 102, an input axis alignable along a substantially vertical axis of the stand-up wheelchair 102, and an output axis alignable along a substantially longitudinal axis of the stand-up wheelchair 102.

In one embodiment, the stand-up wheelchair comprises two gyroscopes nominally mounted with similar or equal spin rates but with opposing spin axes (e.g., one along the negative longitudinal axis and the other along the positive longitudinal axis) so as to have a minimal net angular momentum. They can be in separate gyroscopic stabilization assemblies or within the same gyroscopic stabilization assembly. Despite their opposing spins, these two gyroscopes can be used to generate a net righting torque by gimbaling each in an opposite direction (e.g., by gimbaling one of the aforementioned gyroscopes clockwise around the vertical axis, and gimbaling the other one counterclockwise, we can generate a righting torque about the transverse axis).

In an embodiment, the gyroscopic stabilization assembly may be configured to reset the spin direction or the spin rate of one or more gyroscopes to a reference value (e.g., to a value before the gyroscope was used to apply a righting torque). This can be done by reversing the gimbaling or spin rate changes used to generate the righting torque, thereby applying a negative righting torque to the standup wheelchair. In order to avoid having this negative righting torque destabilize the standup wheelchair it can be applied at a lower magnitude and responsive to a detected stability value of the standup wheelchair. In an embodiment, the stability value can be based on a center-of-mass location (e.g., below a vertical threshold value), on a configuration of the stand-up assembly (e.g., in a sitting position), on speed/acceleration/tilt values for the standup wheelchair, etc. In an embodiment, the negative righting torque may be applied at a lower magnitude, but over a longer time duration, than the original righting torque so as to adequately reset the angular momentum (direction and/or spin rate) of the gyroscope.

In an embodiment, the gyroscopic stabilization assembly 202 is responsive to a change in a stand-up wheelchair center of mass location. For example, in an embodiment, the gyroscopic stabilization assembly 202 is responsive to a change in a stand-up wheelchair vertical center of mass location. In an embodiment, the gyroscopic stabilization assembly 202 includes a rotor 206 operable to apply a righting torque on the stand-up assembly 104 structure responsive to a change in a stand-up wheelchair center of mass location. In an embodiment, the gyroscopic stabilization assembly 202 includes a rotor 206 operable to apply a righting torque on the stand-up assembly 104 structured responsive to a change in a stand-up wheelchair center of mass location.

In an embodiment, the stand-up wheelchair system 100 includes a stand-up wheelchair 102 having a dynamic stability controller 208 operably coupled to the gyroscopic stabilization assembly 202. In an embodiment, the dynamic stability controller 208 is operable to cause the gyroscopic stabilization assembly 202 to precess about the output axis responsive to a change in an applied torque. In an embodiment, the dynamic stability controller 208 is operably coupled to a selectively tiltable and retractable passenger support structure, and is operable to cause the gyroscopic stabilization assembly 202 to precess about the output axis responsive changes in configuration of the tiltable and retractable passenger support structure.

In an embodiment, the dynamic stability controller 208 includes circuitry operable to cause a passenger support structure to tilt or retract responsive to a change in an applied torque. In an embodiment, the dynamic stability controller 208 includes circuitry for activating the gyroscopic stabilization assembly 202 to apply the righting torque responsive to an applied torque.

In an embodiment, the dynamic stability controller 208 includes circuitry for activating the gyroscopic stabilization assembly 202 responsive to a change in configuration of the stand-up assembly 104 assisting a passenger from a sitting position, a kneeling position, a reaching position, or a leaning position, to a substantially standing position. In an embodiment, the dynamic stability controller 208 includes circuitry for activating the gyroscopic stabilization assembly 202 to apply a righting torque responsive to a change in configuration of the stand-up assembly 104.

In an embodiment, the dynamic stability controller 208 includes circuitry for activating application of a righting torque responsive to a change in a stand-up wheelchair 102 yaw, pitch, or roll. For example, in an embodiment, the dynamic stability controller 208 includes circuitry for activating the gyroscopic stabilization assembly 202 to apply a righting torque responsive to a change in a stand-up wheelchair 102 yaw, pitch, or roll. In an embodiment, the dynamic stability controller 208 includes circuitry for activating the gyroscopic stabilization assembly 202 to apply a righting torque responsive to a change in a measured tilt of the stand-up wheelchair 102. In an embodiment, the dynamic stability controller 208 includes circuitry for activating the gyroscopic stabilization assembly 202 to apply a righting torque responsive to a change in a target tilt of the stand-up wheelchair 102.

In an embodiment, the dynamic stability controller 208 includes circuitry for detecting an externally applied torque. In an embodiment, the dynamic stability controller 208 includes one or more sensors for detecting an externally applied torque. For example, in an embodiment, the dynamic stability controller 208 includes one or more gyroscopic sensor for detecting an externally applied torque.

In an embodiment, the stand-up wheelchair system 100 includes a stand-up wheelchair 102 having a biomechanical-energy harvesting generator operably coupled to one or more of the plurality of rotatable members, the biomechanical-energy harvesting generator configured to convert kinetic energy from rotation of the one or more of the plurality of rotatable members 114 to electricity. In an embodiment, the stand-up wheelchair system 100 includes a stand-up wheelchair 102 having a biomechanical-energy harvesting generator operably coupled to an energy store.

In an embodiment, the stand-up wheelchair system 100 includes a stand-up wheelchair 102 having a travel route module 146 including circuitry operable to generate travel route status information. In an embodiment, the travel route module 146 includes circuitry operable to acquire travel-route status information, the travel-route status information to be acquired including one or more of travel-route traffic information, travel-route obstacle location information, travel-route map information, or travel-route geographical location information; travel-route surface information. In an embodiment, the travel route module 146 includes circuitry operable to acquire travel-route status information from a remote network. In an embodiment, the travel route module 146 includes circuitry operable to acquire travel-route, stand-up wheelchair 102, access information from a remote network. In an embodiment, the travel route module 146 includes circuitry operable to acquire pedestrian traffic information from a remote network. In an embodiment, the travel route module 146 includes circuitry operable to generate real-time travel route status information responsive to an input indicated of a change to a travel-route status.

In an embodiment, the stand-up wheelchair system 100 includes one or more modules that communicate with one or more travel-path sensor 128 that informed the circuitry for actuating the stand-up assembly 104 regarding, for example, object (shelves, fixtures, appliances, etc.), object location, object identification, or the like. In embodiment, during operation, the stand-up wheelchair system 100 communicates with one or more travel-path sensor 128 to determine a target configuration (e.g., sitting configuration, kneeling configuration, reaching configuration, leaning configuration, standing configuration, etc.) for the stand-up assembly 104. In an embodiment, a stand-up wheelchair system 100 includes circuitry for determining a target transition for the stand-up assembly 104.

In an embodiment, the stand-up wheelchair system 100 includes a stand-up wheelchair 102 having virtual object generator 148 operably coupled to the ravel route module 146, the virtual object generator 148 including circuitry for generating a virtual representation of travel route status information on a virtual display.

In an embodiment, the stand-up wheelchair system 100 includes circuitry for actuating a gyroscopic stabilization assembly 202 having at least one gyroscope operable to apply a righting torque along one or more of a transverse axis, a longitudinal axis, and a vertical axis of the stand-up wheelchair responsive to changes in a stand-up wheelchair vertical center of mass location. In an embodiment, the stand-up wheelchair system 100 includes circuitry for actuating a stand-up assembly 104 configured to support a passenger transitioning from a sitting configuration to a standing configuration. In an embodiment, the stand-up wheelchair system 100 includes circuitry for sensing a stand-up wheelchair 102 mass distribution and for determining a stand-up wheelchair 102 center of mass location. In an embodiment, the circuitry for activating the gyroscopic stabilization assembly includes a velocity sensor operable to detect a velocity of the stand-up wheelchair. In an embodiment, the circuitry for sensing the stand-up wheelchair mass distribution includes one or more mass sensor operable to detect a mass distribution of the stand-up wheelchair. In an embodiment, the circuitry for actuating rotation of the rotor 206 about the first axis is operable to actuate rotation of the rotor 206 responsive to a detected change in the mass distribution of the stand-up wheelchair.

In an embodiment, the circuitry for actuating a gyroscopic stabilization assembly 202 is operable to actuate the gyroscopic stabilization assembly 202 responsive to a detected change in acceleration of the stand-up wheelchair. In an embodiment, the circuitry for activating the gyroscopic stabilization assembly includes one or more angular velocity sensors. In an embodiment, the circuitry for actuating rotation of the rotor 206 about the first axis includes circuitry for actuating rotation of the rotor 206 about the first axis responsive to a detected change in angular velocity.

In an embodiment, the stand-up wheelchair system 100 includes a stand-up wheelchair 102 having circuitry for harvesting kinetic energy from rotation of the one or more of the plurality of rotatable members 114.

In an embodiment, the stand-up wheelchair system 100 includes a stand-up assembly module including circuitry for actuating a stand-up assembly 104 to transition from a first configuration to a second configuration (e.g., from a sitting configuration to a standing configuration, from a standing configuration to a sitting configuration, from a leaning configuration to a sitting configuration, etc.). In an embodiment, the stand-up wheelchair system 100 includes a mass distribution module including circuitry for sensing a stand-up wheelchair mass distribution and for determining a stand-up wheelchair vertical center of mass location. In an embodiment, the stand-up wheelchair system 100 includes a gyroscopic stabilizer module including circuitry for actuating a gyroscope responsive to a detected change in a stand-up wheelchair mass distribution or a stand-up wheelchair vertical center of mass location.

FIG. 3 shows a stand-up wheelchair system 100 in which one or more methodologies or technologies can be implemented such as, for example, transporting and physically supporting an individual subject (e.g., a patient, a human subject, an animal subject, a user, a passenger, etc.), as well as assisting and supporting a user to transition between a sitting position, a kneeling position, a reaching position, or a leaning position, and a substantially standing position. In an embodiment, the stand-up wheelchair system 100 includes a stand-up wheelchair 102 having a stand-up assembly 104. In an embodiment the a stand-up assembly 104 includes an articulated structure movable between a sitting configuration, a kneeling configuration, a reaching configuration, a leaning configuration, or a standing configuration and a different one of a sitting configuration, a kneeling configuration, a reaching configuration, a leaning configuration, or a standing configuration. In an embodiment, the stand-up assembly 104 is structured and dimensioned to support a passenger transitioning between a sitting position, a reaching position, a leaning position, or standing position and a different one of a sitting position, a kneeling position, a reaching position, or a leaning position, and a standing position. In an embodiment, the stand-up wheelchair system 100 includes a stand-up wheelchair 102 having a plurality of rotatable members 114 operable to frictionally interface the stand-up wheelchair 102 to a travel surface and to move the stand-up wheelchair along the travel surface.

In an embodiment, the stand-up wheelchair system 100 includes a stabilization assembly 302 having one or more flywheels 304, 306 operable to apply a righting torque along one or more of a transverse axis, a longitudinal axis, a vertical axis of the stand-up wheelchair, or combinations thereof. In an embodiment, the stand-up wheelchair system 100 includes a stabilization assembly 302 having one or more flywheels 304, 306 operable to apply a righting torque along one or more of a transverse axis, a longitudinal axis, a vertical axis of the stand-up wheelchair, or combinations thereof. In an embodiment, the stand-up wheelchair system 100 includes a dynamic stability controller 208 operably coupled to the stabilization assembly 302, the dynamic stability controller 208 operable to cause one or more flywheels 304, 306 to spin responsive to an externally applied torque or a change in an externally applied torque. In an embodiment, the stabilization assembly 302 includes at least two flywheels 304, 306 and is operable to apply at least a first righting torque and a second righting torque along non-collinear axes.

In an embodiment, the stand-up wheelchair system 100 includes a stand-up wheelchair 102 having one or more sensors for detecting an externally applied torque on the stand-up wheelchair. In an embodiment, the dynamic stability controller 208 is operable to actuate at least two flywheels 304, 306 responsive to a detected change in stability of the stand-up wheelchair 102. For example, in an embodiment, the dynamic stability controller 208 is operable to actuate at least two of flywheels 304, 306 so as to apply at least a first righting torque and a second righting torque along non-collinear axes responsive to an externally applied torque. In an embodiment, the dynamic stability controller 208 includes a circuitry for varying a spin rate of at least one flywheel 304, 306 responsive to an externally applied torque. In an embodiment, the dynamic stability controller 208 includes a circuitry for varying a spin direction of at least one flywheel 304, 306 responsive to an externally applied torque. In an embodiment, the stand-up wheelchair system 100 includes a stand-up wheelchair 102 having one or more sensors for detecting a magnitude and direction of an angular velocity of at least one flywheel 304, 306.

In an embodiment, a stand-up wheelchair system 100 includes circuitry for actuating a stand-up assembly 104 configured to support a passenger transitioning between a sitting position, a kneeling position, a reaching position, or a leaning position, and a substantially standing position.

In an embodiment, the stand-up wheelchair system 100 includes circuitry for sensing a stand-up wheelchair mass distribution and for determining a stand-up wheelchair center of mass location. In an embodiment, the stand-up wheelchair system 100 includes circuitry for actuating rotation of at least a first flywheel 304 about a first axis responsive to changes in a stand-up wheelchair center of mass location. In an embodiment, the stand-up wheelchair system 100 includes circuitry for actuating rotation of at least a first flywheel 304 about a first axis responsive to changes in a stand-up wheelchair mass distribution. In an embodiment, the stand-up wheelchair system 100 includes circuitry for actuating rotation of at least a second flywheel 306 about a second axis responsive to changes in a stand-up wheelchair mass distribution. In an embodiment, the stand-up wheelchair system 100 includes circuitry for actuating rotation of at least a second flywheel 306 about a second axis responsive to changes in a stand-up wheelchair center of mass location.

In an embodiment, the stand-up wheelchair system 100 includes circuitry for actuating rotation of at least a second flywheel 306 about a second axis different from the first axis responsive to changes in a stand-up wheelchair center of mass location. In an embodiment, the stand-up wheelchair system 100 includes circuitry for actuating rotation of at least a third flywheel about a third axis responsive to changes in a stand-up wheelchair center of mass location. In an embodiment, the stand-up wheelchair system 100 includes circuitry for actuating rotation of at least a third flywheel about a third axis different from the first axis and the second axis responsive to changes in a stand-up wheelchair center of mass location.

In an embodiment, the stand-up wheelchair system 100 includes circuitry for detecting a change in a stand-up wheelchair speed. In an embodiment, the stand-up wheelchair system 100 includes circuitry for detecting a change in a target stand-up wheelchair acceleration. In an embodiment, the stand-up wheelchair system 100 includes circuitry for detecting a change in a stand-up wheelchair tilt.

In an embodiment, the stand-up wheelchair system 100 includes circuitry for detecting an externally applied torque. In an embodiment, the stand-up wheelchair system 100 includes circuitry for actuating torque about at least one of a transverse axis, a longitudinal axis, or a vertical axis of the stand-up wheelchair. For example, in an embodiment, the stand-up wheelchair system 100 includes circuitry for varying a spin rate of the at least first flywheel 304 about the first axis responsive to changes in a stand-up wheelchair center of mass location. In an embodiment, the stand-up wheelchair system 100 includes circuitry for varying a spin direction of the at least first flywheel 304 about the first axis responsive to changes in a stand-up wheelchair center of mass location.

Figure 4:
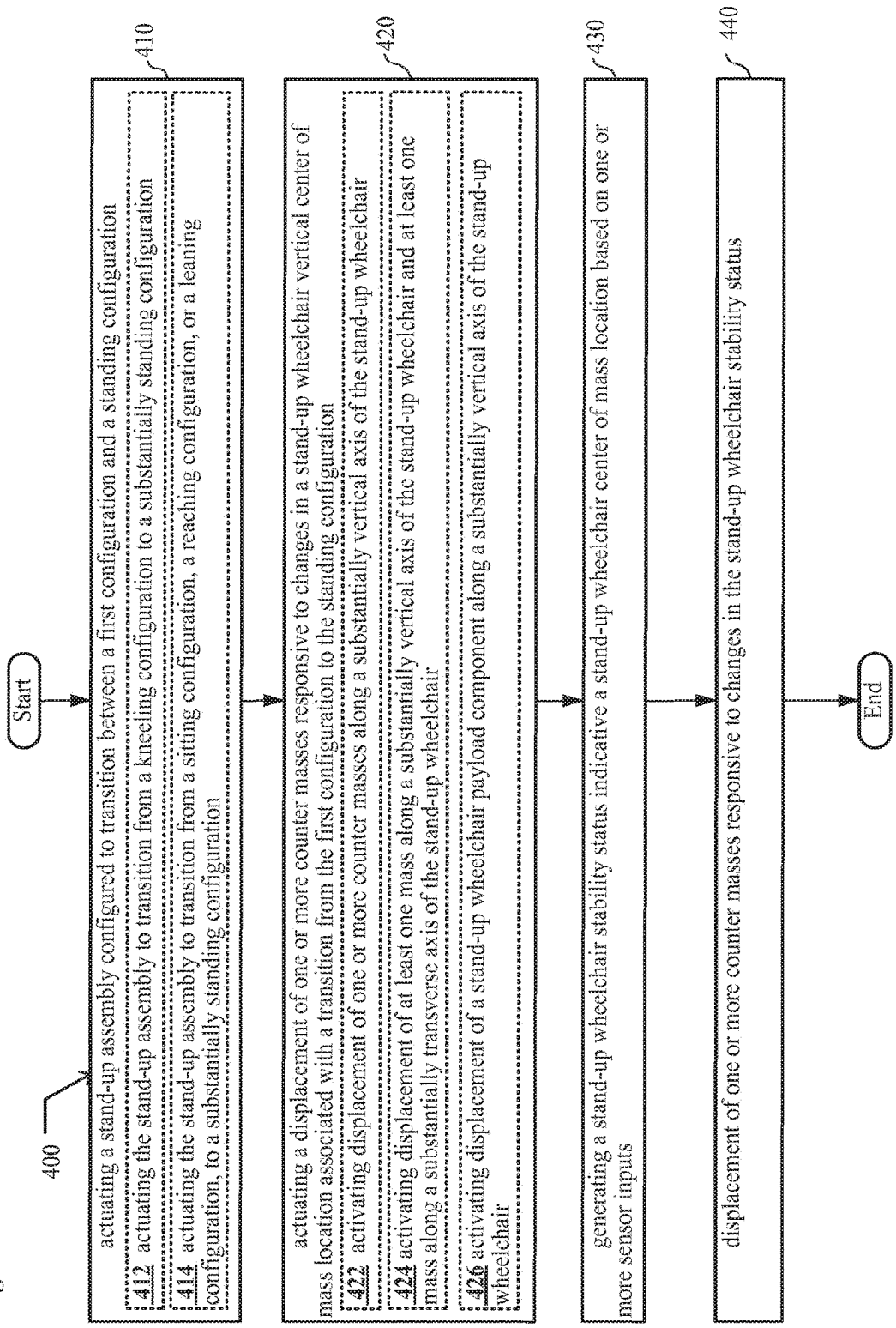
FIG. 4 shows a flow diagram of a method of operating a stand-up wheelchair according to one embodiment.

FIG. 4 shows a method 400 of method of operating a stand-up wheelchair. At 410, the method 400 includes actuating a stand-up assembly 104 configured to transition between a first configuration and a standing configuration.

At 412, actuating the stand-up assembly 104 includes actuating the stand-up assembly 104 to transition from a kneeling configuration to a substantially standing configuration. At 414, actuating the stand-up assembly 104 includes actuating the stand-up assembly 104 to transition from a sitting configuration, a kneeling configuration, a reaching configuration, or a leaning configuration, to a substantially standing configuration.

At 420, the method 400 includes actuating a displacement of one or more counter masses 122 responsive to changes in a stand-up wheelchair vertical center of mass location associated with a transition from the first configuration to the standing configuration. At 422, actuating the displacement of one or more counter masses 122 includes activating displacement of one or more counter masses 122 along a substantially vertical axis of the stand-up wheelchair. At 424, actuating the displacement of one or more counter masses 122 includes activating displacement of at least one mass along a substantially vertical axis of the stand-up wheelchair and at least one mass along a substantially transverse axis of the stand-up wheelchair. At 426, actuating the displacement of one or more counter masses 122 includes activating displacement of a stand-up wheelchair payload component along a substantially vertical axis of the stand-up wheelchair.

At 430, the method 400 includes generating a stand-up wheelchair stability status indicative of a stand-up wheelchair center of mass location based on one or more sensor inputs. At 440, the method 400 includes actuating a displacement of one or more counter masses 122 responsive to changes in the stand-up wheelchair stability status.

Figure 5:
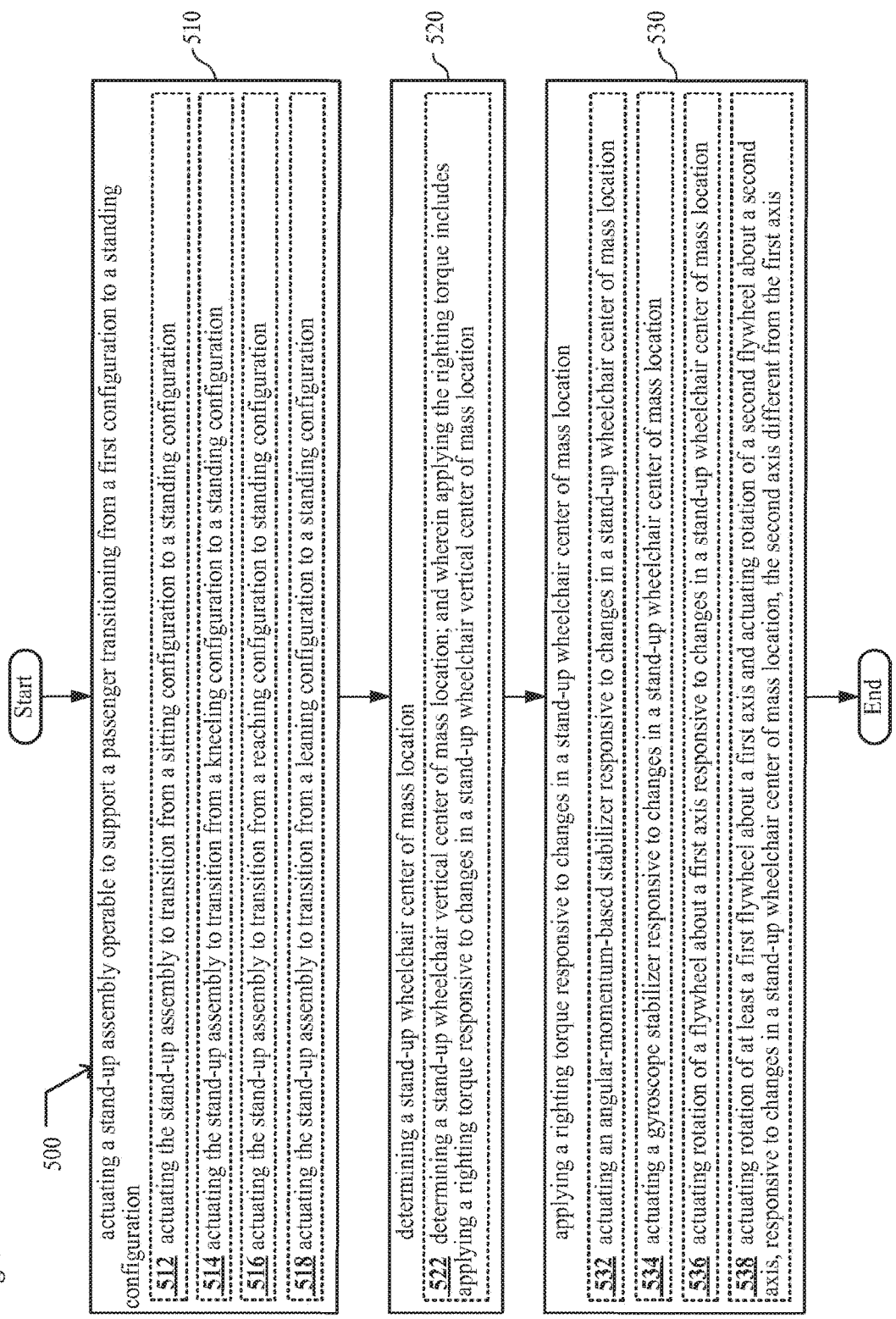
FIG. 5 shows a flow diagram of a method of operating a stand-up wheelchair according to one embodiment.

FIG. 5 shows a method 500 of method of operating a stand-up wheelchair. At 510, the method 500 includes actuating a stand-up assembly 104 operable to support a passenger transitioning from a first configuration to a standing configuration. At 512, actuating the stand-up assembly 104 includes actuating the stand-up assembly 104 to transition from a sitting configuration to a standing configuration. At 514, actuating the stand-up assembly 104 includes actuating the stand-up assembly 104 to transition from a kneeling configuration to a standing configuration. At 516, actuating the stand-up assembly 104 includes actuating the stand-up assembly 104 to transition from a reaching configuration to standing configuration. At 518, actuating the stand-up assembly 104 includes actuating the stand-up assembly 104 to transition from a leaning configuration to a standing configuration.

At 520, the method 500 includes determining a stand-up wheelchair center of mass location. At 522, determining the stand-up wheelchair mass distribution includes determining a stand-up wheelchair vertical center of mass location; and applying the righting torque includes applying a righting torque responsive to changes in a stand-up wheelchair vertical center of mass location.

At 530, the method 500 includes applying a righting torque responsive to changes in a stand-up wheelchair center of mass location. At 532, applying a righting torque includes actuating an angular-momentum-based stabilizer responsive to changes in a stand-up wheelchair center of mass location. At 534, applying a righting torque includes actuating a gyroscope stabilizer responsive to changes in a stand-up wheelchair center of mass location. At 536, applying a righting torque includes actuating rotation of a flywheel about a first axis responsive to changes in a stand-up wheelchair center of mass location. At 538, applying a righting torque includes actuating rotation of at least a first flywheel 304 about a first axis and actuating rotation of a second flywheel 306 about a second axis, responsive to changes in a stand-up wheelchair center of mass location, the second axis different from the first axis.

Figure 6:
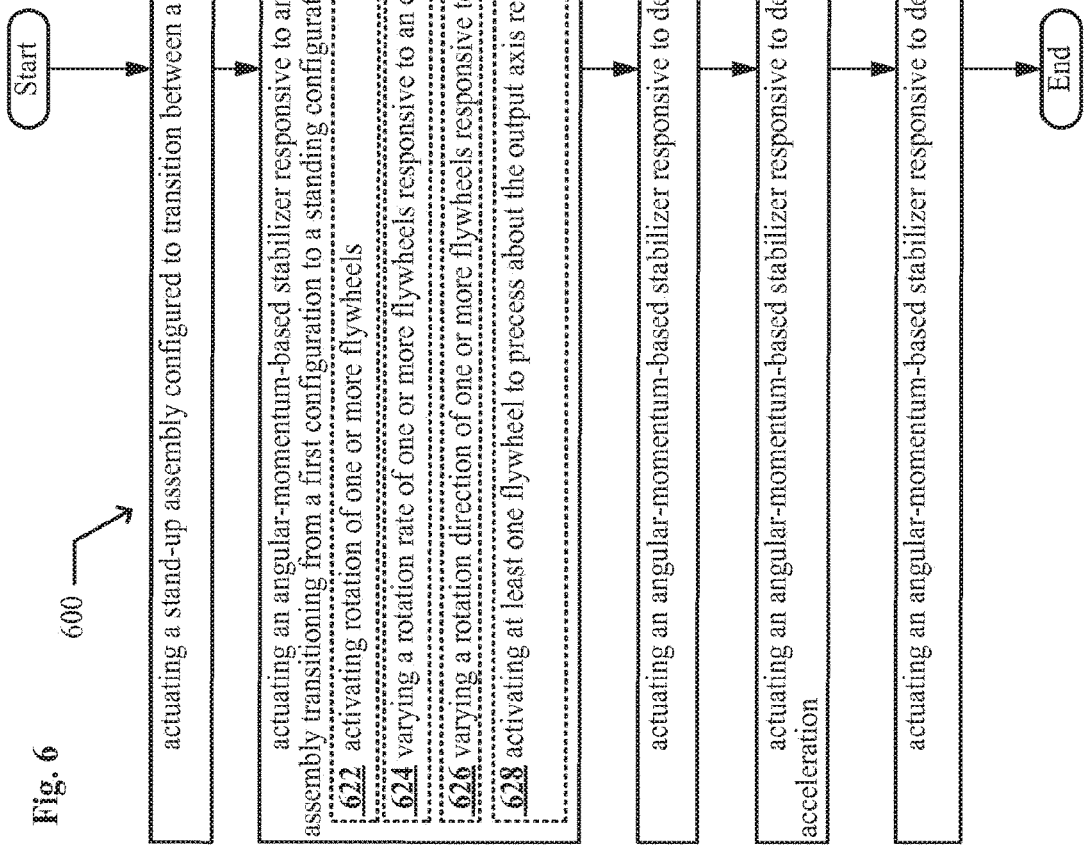
FIG. 6 shows a flow diagram of a method of operating a stand-up wheelchair according to one embodiment.

FIG. 6 shows a method 600 of method of operating a stand-up wheelchair. At 610, the method 600 includes actuating a stand-up assembly 104 configured to support a passenger transitioning from a first configuration to a standing configuration. At 620, the method 600 includes actuating an angular-momentum-based stabilizer responsive to an applied torque associated with a stand-up assembly 104 transitioning from a first configuration to a standing configuration. At 622, actuating the angular-momentum-based stabilizer includes activating rotation of one or more flywheels 304, 306. At 624, actuating the angular-momentum-based stabilizer includes varying a rotation rate of one or more flywheels 304, 306 responsive to an externally applied torque. At 626, actuating the angular-momentum-based stabilizer includes varying a rotation direction of one or more flywheels 304, 306 responsive to an externally applied torque. At 628, actuating the angular-momentum-based stabilizer includes activating at least one flywheel to precess about the output axis responsive to an externally applied torque. At 630, the method 600 includes actuating an angular-momentum-based stabilizer responsive to detecting a change in a stand-up wheelchair speed. At 640, the method 600 includes actuating an angular-momentum-based stabilizer responsive to detecting a change in a target stand-up wheelchair acceleration. At 650, the method 600 includes actuating an angular-momentum-based stabilizer responsive to detecting a change in a stand-up wheelchair tilt.

Figure 7:
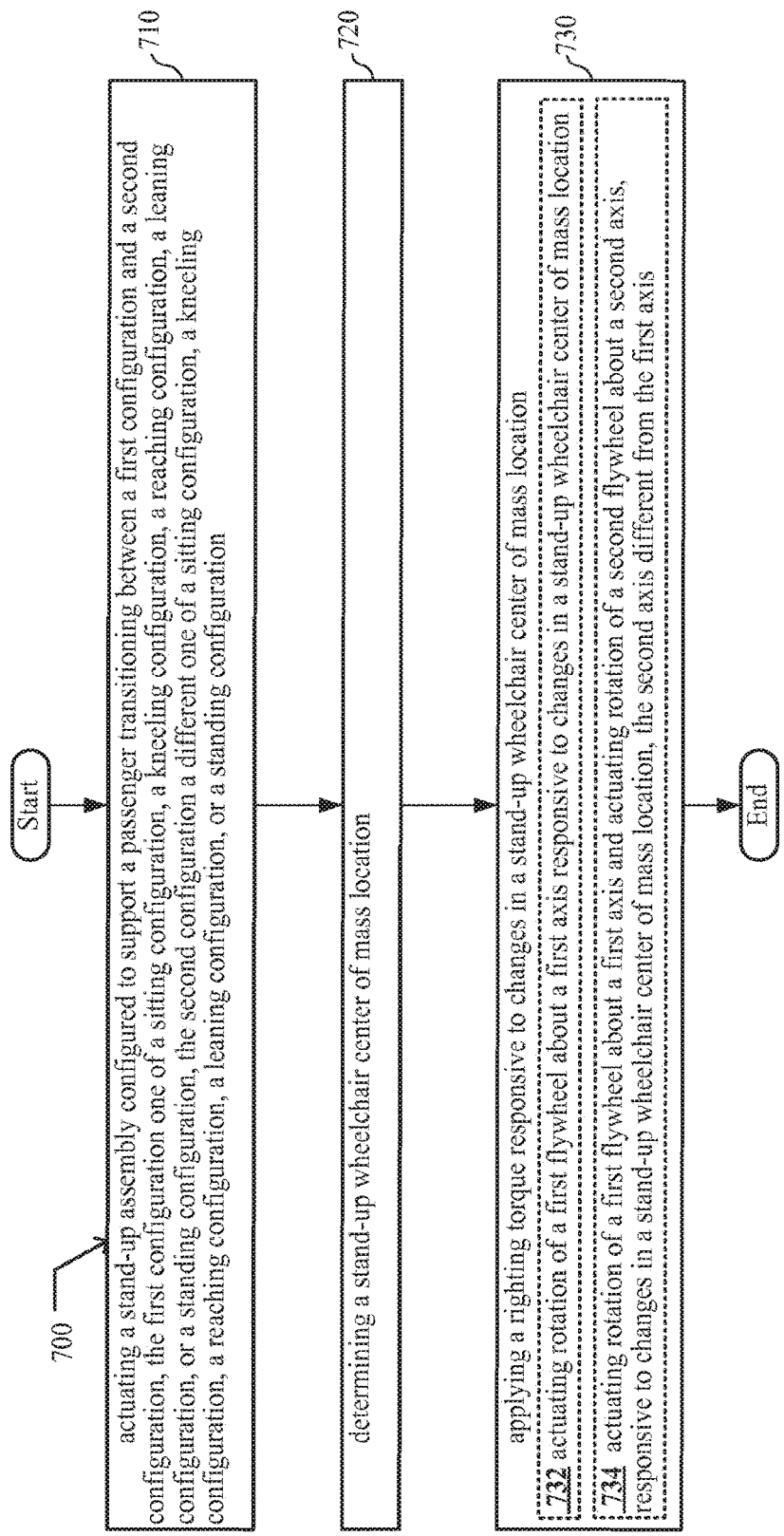
FIG. 7 shows a flow diagram of a method of operating a stand-up wheelchair according to one embodiment.

FIG. 7 shows a method 700 of method of operating a stand-up wheelchair. At 710, the method 700 includes actuating a stand-up assembly 104 configured to support a passenger transitioning between a first configuration and a second configuration, the first configuration one of a sitting configuration, a kneeling configuration, a reaching configuration, a leaning configuration, or a standing configuration, the second configuration a different one of a sitting configuration, a kneeling configuration, a reaching configuration, a leaning configuration, or a standing configuration. At 720, the method 700 includes determining a stand-up wheelchair center of mass location.

At 730, the method 700 includes applying a righting torque responsive to changes in a stand-up wheelchair center of mass location. At 732, applying a righting torque includes actuating rotation of a first flywheel 304 about a first axis responsive to changes in a stand-up wheelchair center of mass location. At 734, applying a righting torque includes actuating rotation of a first flywheel 304 about a first axis and actuating rotation of a second flywheel 306 about a second axis, responsive to changes in a stand-up wheelchair center of mass location, the second axis different from the first axis.

In an embodiment, the method 700 includes detecting a stability value for the stand-up wheelchair, and in response applying a negative righting torque. In an embodiment, applying the negative righting torque includes applying a negative righting torque selected to not destabilize the standup wheelchair. In an embodiment, applying the negative righting torque includes applying a negative righting for a time sufficient to reset a spin direction of a gyroscope used to apply the righting torque. In an embodiment, applying the negative righting torque includes applying a negative righting for a time sufficient to a spin rate of a gyroscope used to apply the righting torque.

It is noted that FIGS. 4-7 denotes "start" and "end" positions. However, nothing herein should be construed to indicate that these are limiting and it is contemplated that other or additional steps or functions can occur before or after those described in FIGS. 4-7.

The claims, description, and drawings of this application may describe one or more of the instant technologies in operational/functional language, for example as a set of operations to be performed by a computer. Such operational/functional description in most instances can be specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions are representative of static or sequenced specifications of various hardware elements. This is true because tools available to implement technical disclosures set forth in operational/functional formats—tools in the form of a high-level programming language (e.g., C, java, visual basic), etc.), or tools in the form of Very high speed Hardware Description Language ("VIDAL," which is a language that uses text to describe logic circuits—)—are generators of static or sequenced specifications of various hardware configurations. This fact is sometimes obscured by the broad term "software," but, as shown by the following explanation, what is termed "software" is a shorthand for a massively complex interchanging/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, available at the website en.wikipedia.org/wiki/High-level-_programming_language (as of Jun. 5, 2012, 21:00 GMT). In order to facilitate human comprehension, in many instances, high-level programming languages resemble or even share symbols with natural languages. See, e.g., Wikipedia, Natural language, available at the website en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct" (e.g., that "software"—a computer program or computer—programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In an embodiment, if a high-level programming language is the tool used to implement a technical disclosure in the form of functions/operations, it can be understood that, far from being abstract, imprecise, "fuzzy," or "mental" in any significant semantic sense, such a tool is instead a near incomprehensibly precise sequential specification of specific computational—machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory devices, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, available at the website en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, available at the website en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, available at the website en.wikipedia.org/wiki/Instructions_per_second (as of Jun. 5, 2012, 21:04 GMT).

Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. Accordingly, any such operational/functional technical descriptions may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, it can be recognizes that a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

At least a portion of the devices or processes described herein can be integrated into an information processing system. An information processing system generally includes one or more of a system unit housing, a video display device, memory, such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), or control systems including feedback loops and control motors (e.g., feedback for detecting position or velocity, control motors for moving or adjusting components or quantities). An information processing system can be implemented utilizing suitable commercially available components, such as those typically found in data computing/communication or network computing/communication systems.

The state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Various vehicles by which processes or systems or other technologies described herein can be effected (e.g., hardware, software, firmware, etc., in one or more machines or articles of manufacture), and that the preferred vehicle will vary with the context in which the processes, systems, other technologies, etc., are deployed. For example, if an implementer determines that speed and accuracy are paramount, the implementer may opt for a mainly hardware or firmware vehicle; alternatively, if flexibility is paramount, the implementer may opt for a mainly software implementation that is implemented in one or more machines or articles of manufacture; or, yet again alternatively, the implementer may opt for some combination of hardware, software, firmware, etc. in one or more machines or articles of manufacture. Hence, there are several possible vehicles by which the processes, devices, other technologies, etc., described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. In an embodiment, optical aspects of implementations will typically employ optically-oriented hardware, software, firmware, etc., in one or more machines or articles of manufacture.

The herein described subject matter sometimes illustrates different components contained within, or connected with, different other components. It is to be understood that such depicted architectures are merely examples, and that in fact, many other architectures can be implemented that achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled, " to each other to achieve the desired functionality, and any two components capable of being so associated can also be viewed as being "operably coupleable, " to each other to achieve the desired functionality. Specific examples of operably coupleable include, but are not limited to, physically mateable, physically interacting components, wirelessly interactable, wirelessly interacting components, logically interacting, logically interactable components, etc.

In an embodiment, one or more components may be referred to herein as "configured to," "configurable to," "operable/operative to," "adapted/adaptable," "able to," "conformable/conformed to," etc. Such terms (e.g., "configured to") can generally encompass active-state components, or inactive-state components, or standby-state components, unless context requires otherwise.

The foregoing detailed description has set forth various embodiments of the devices or processes via the use of block diagrams, flowcharts, or examples. Insofar as such block diagrams, flowcharts, or examples contain one or more functions or operations, it will be understood by the reader that each function or operation within such block diagrams, flowcharts, or examples can be implemented, individually or collectively, by a wide range of hardware, software, firmware in one or more machines or articles of manufacture, or virtually any combination thereof. Further, the use of "Start," "End," or "Stop" blocks in the block diagrams is not intended to indicate a limitation on the beginning or end of any functions in the diagram. Such flowcharts or diagrams may be incorporated into other flowcharts or diagrams where additional functions are performed before or after the functions shown in the diagrams of this application. In an embodiment, several portions of the subject matter described herein is implemented via Application Specific Integrated Circuits (ASICs), Field Programmable Gate Arrays (FPGAs), digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software and or firmware would be well within the skill of one of skill in the art in light of this disclosure. In addition, the mechanisms of the subject matter described herein are capable of being distributed as a program product in a variety of forms, and that an illustrative embodiment of the subject matter described herein applies regardless of the particular type of signal-bearing medium used to actually carry out the distribution. Non-limiting examples of a signal-bearing medium include the following: a recordable type medium such as a floppy disk, a hard disk drive, a Compact Disc (CD), a Digital Video Disk (DVD), a digital tape, a computer memory, etc.; and a transmission type medium such as a digital or an analog communication medium (e.g., a fiber optic cable, a waveguide, a wired communications link, a wireless communication link (e.g., transmitter, receiver, transmission logic, reception logic, etc.), etc.).

While particular aspects of the present subject matter described herein have been shown and described, it will be apparent to the reader that, based upon the teachings herein, changes and modifications can be made without departing from the subject matter described herein and its broader aspects and, therefore, the appended claims are to encompass within their scope all such changes and modifications as are within the true spirit and scope of the subject matter described herein. In general, terms used herein, and especially in the appended claims (e.g., bodies of the appended claims) are generally intended as "open" terms (e.g., the term "including" should be interpreted as "including but not limited to, " the term "having" should be interpreted as "having at least, " the term "includes" should be interpreted as "includes but is not limited to, " etc.). Further, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, such recitation should typically be interpreted to mean at least the recited number (e.g., the bare recitation of "two recitations, " without other modifiers, typically means at least two recitations, or two or more recitations). Furthermore, in those instances where a convention analogous to "at least one of A, B, and C, etc." is used, in general such a construction is intended in the sense of the convention (e.g., " a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense of the convention (e.g., " a system having at least one of A, B, or C" would include but not be limited to systems that have A alone, B alone, C alone, A and B together, A and C together, B and C together, and/or A, B, and C together, etc.). Typically a disjunctive word or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, the operations recited therein generally may be performed in any order. Also, although various operational flows are presented in a sequence(s), it should be understood that the various operations may be performed in orders other than those that are illustrated, or may be performed concurrently. Examples of such alternate orderings includes overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A stand-up wheelchair, comprising:
a stand-up assembly structured and dimensioned to support a passenger to transition between a first configuration and a second configuration while in use;
a plurality of rotatable members operable to frictionally interface the stand-up wheelchair to a travel surface and to move the stand-up wheelchair along the travel surface; and
a stabilization assembly having at least one of (i) a gyroscope operable to apply a righting torque along an output axis of the stand-up wheelchair responsive to a change in a stability status associated with a transition between the first configuration and the second configuration and (ii) a plurality of flywheels operable to apply a righting torque along one or more of a transverse axis, a longitudinal axis, or a vertical axis of the stand-up wheelchair responsive to a change in the stability status.

2. The stand-up wheelchair of claim 1, wherein the stabilization assembly includes the gyroscope operable to apply the righting torque along the output axis of the stand-up wheelchair responsive to a change in the stability status.

3. The stand-up wheelchair of claim 2, further comprising:
circuitry operably coupled to the stabilization assembly, the circuitry operable to gimbal the gyroscope about an input axis to apply the righting torque about the output axis responsive to a change in the stability status.

4. The stand-up wheelchair of claim 1, wherein the stabilization assembly further includes a variable center of mass assembly including one or more counter masses operable to displace the one or more counter masses responsive to a change in the stability status.

5. The stand-up wheelchair of claim 4, further comprising:
circuitry operably coupled to the stabilization assembly, the circuitry operable to activate displacement of the one or more counter masses responsive to a change in the stability status.

6. The stand-up wheelchair of claim 1, wherein the stabilization assembly includes the plurality of flywheels operable to apply the righting torque along one or more of the transverse axis, the longitudinal axis, or the vertical axis of the stand-up wheelchair responsive to a change in the stability status.

7. The stand-up wheelchair of claim 6, further comprising:
circuitry operably coupled to the stabilization assembly, the circuitry operable to actuate rotation of at least one flywheel of the plurality of flywheels responsive to a change in the stability status.

8. The stand-up wheelchair of claim 1, wherein the first configuration is at least one of a sitting position, a kneeling position, a reaching position, and a leaning position, and wherein the second configuration is a substantially standing position.

9. The stand-up wheelchair of claim 8, wherein the stand-up assembly includes an articulated structure movable between a sitting configuration, a kneeling configuration, a reaching configuration, a leaning configuration, or a standing configuration and a different one of a sitting configuration, a kneeling configuration, a reaching configuration, a leaning configuration, or a standing configuration.

10. The stand-up wheelchair of claim 1, wherein the stand-up assembly includes a selectively tiltable or retractable passenger support structure; and wherein the stabilization assembly includes circuitry operable to cause the passenger support structure to tilt or retract responsive to a change in an applied torque.

11. The stand-up wheelchair of claim 1, further comprising:
circuitry for activating the stabilization assembly to apply a righting torque responsive to a change in a tilt of the stand-up wheelchair.

12. The stand-up wheelchair of claim 1, further comprising:
circuitry for detecting an externally applied torque.

13. The stand-up wheelchair of claim 1, further comprising:
a travel route module including circuitry operable to generate travel route status information.

14. The stand-up wheelchair of claim 13, wherein the travel route module includes circuitry operable to acquire travel-route status information from a remote network.

15. The stand-up wheelchair of claim 13, wherein the travel route module includes circuitry operable to acquire travel-route wheelchair access information from a remote network.

16. The stand-up wheelchair of claim 13, wherein the travel route module includes circuitry operable to acquire pedestrian traffic information from a remote network.

17. The stand-up wheelchair of claim 13, further comprising:
a virtual object generator operably coupled to the travel route module, the virtual object generator including circuitry for generating a virtual representation of travel route status information on a virtual display.

18. The stand-up wheelchair of claim 1, wherein the stabilization assembly includes two gyroscopes rotating along substantially opposite spin axes, the two gyroscopes configured to be gimbaled upon substantially opposite input axes, so as to produce righting torques about substantially aligned output axes.

19. A stand-up wheelchair system, comprising:
circuitry for actuating a stand-up assembly configured to support a passenger transitioning between a sitting configuration and a substantially standing configuration;
circuitry for sensing a stand-up wheelchair mass distribution and for determining a standup wheelchair vertical center of mass location; and
circuitry for actuating a stabilization assembly having at least one of (i) a gyroscope operable to apply a righting torque along an output axis of the stand-up wheelchair responsive to a change in a stability status associated with a transition between the sitting configuration and the substantially standing configuration and (ii) a plurality of flywheels operable to apply a righting torque along one or more of a transverse axis, a longitudinal axis, or a vertical axis of the stand-up wheelchair responsive to a change in the stability status.

20. A stand-up wheelchair, comprising:
a stand-up assembly structured and dimensioned to support a passenger to transition between a first configuration and a second configuration while in use;
a plurality of rotatable members operable to frictionally interface the stand-up wheelchair to a travel surface and to move the stand-up wheelchair along the travel surface; and
a stabilization assembly having at least one of (i) a gyroscope operable to apply a righting torque along an output axis of the stand-up wheelchair responsive to a change in a stability status associated with a transition between the first configuration and the second configuration, (ii) a variable center of mass assembly including one or more counter masses operable to displace the one or more counter masses responsive to a change in the stability status, and (iii) a plurality of flywheels operable to apply a righting torque along one or more of a transverse axis, a longitudinal axis, or a vertical axis of the stand-up wheelchair responsive to a change in the stability status,
wherein the stand-up assembly includes a selectively tiltable or retractable passenger support structure; and wherein the stabilization assembly includes circuitry operable to cause the selectively tiltable or retractable passenger support structure to tilt or retract responsive to a change in an applied torque.

* * * * *